(12) United States Patent
Radoane

(10) Patent No.: US 8,789,329 B2
(45) Date of Patent: Jul. 29, 2014

(54) NP-EIFS NON-PERMISSIVE EXTERIOR INSULATION AND FINISH SYSTEMS CONCEPT TECHNOLOGY AND DETAILS

(76) Inventor: Marius Radoane, Lawrenceville, GA (US)

( * ) Notice: Subject to any disclaimer, the term of this patent is extended or adjusted under 35 U.S.C. 154(b) by 0 days.

(21) Appl. No.: 12/766,950

(22) Filed: Apr. 26, 2010

(65) Prior Publication Data
US 2011/0258944 A1 Oct. 27, 2011

(51) Int. Cl.
*E04C 1/00* (2006.01)
(52) U.S. Cl.
USPC ........... 52/309.5; 52/417; 52/483.1; 52/746.1
(58) Field of Classification Search
USPC ............... 52/746.1, 309.5, 169.5, 417, 481.1, 52/483.1, 293.3, 344, 745.09, 309.4
See application file for complete search history.

(56) References Cited

U.S. PATENT DOCUMENTS

| | | | | |
|---|---|---|---|---|
| 4,019,296 | A * | 4/1977 | Jochmann | 52/268 |
| 4,489,531 | A * | 12/1984 | Nelson | 52/745.06 |
| 5,027,572 | A * | 7/1991 | Purcell et al. | 52/309.9 |
| 5,323,573 | A * | 6/1994 | Bakewell, III | 52/86 |
| 5,410,852 | A * | 5/1995 | Edgar et al. | 52/408 |
| 5,826,388 | A * | 10/1998 | Irving | 52/302.1 |
| 6,931,809 | B1 * | 8/2005 | Brown et al. | 52/409 |
| 6,945,005 | B2 * | 9/2005 | Nunley | 52/650.3 |
| 7,836,652 | B2 * | 11/2010 | Futterman | 52/417 |
| 2003/0046888 | A1 * | 3/2003 | Ryan | 52/302.1 |
| 2004/0200154 | A1 * | 10/2004 | Hunter, Jr. | 52/90.1 |
| 2006/0009100 | A1 * | 1/2006 | McGroarty | 442/44 |
| 2006/0277854 | A1 * | 12/2006 | Egan | 52/302.3 |
| 2007/0011986 | A1 * | 1/2007 | Serino et al. | 52/782.1 |
| 2008/0245007 | A1 * | 10/2008 | McDonald | 52/309.5 |
| 2008/0245026 | A1 * | 10/2008 | Hamilton | 52/698 |
| 2011/0078971 | A1 * | 4/2011 | Adams | 52/517 |

OTHER PUBLICATIONS

Web archived details of Dryvit Outsulation System from the wayback machine, Oct. 19, 2006: http://web.archive.org/web/20061019235057/http://www.dryvit.com/fileshare/doc/us/detail/ds107.pdf.*
Definition of silicone on dictionary.com found at: http://dictionary.reference.com/browse/silicone.*

* cited by examiner

*Primary Examiner* — Brian Glessner
*Assistant Examiner* — Brian D Mattei

(57) ABSTRACT

A new concept wall system is provided, wherein the Exterior Insulation and Finish System cladding is created using components with no water absorption, a very low vapor permeability and sealing properties, accommodated with an installation technology which extend the materials properties to the assembly, together with bonding and sealing the intersections and terminations, creating a Non-Permissive to water and vapor diffusion, Exterior Insulation and Finish System (NP-EIFS). The present invention relates to an EIFS cladding having two air and vapor barriers, one applied to the substrate, a continuous liquid membrane with sheathing joints sealed to be moisture barrier for inside vapors, and an exterior weather and vapor barrier which is created using closed cell extruded polystyrene insulation boards, special assembled with joints sealed, to create a non-permissive insulation envelope of the enclosure. Another object of the invention is to provide waterproof and air/vapor-proof details, a new concept of flashing and sealant application around windows/doors and other constructive elements to avoid thermal bridges and air leakage inside thermal envelope and wall assembly. Methods of installation are included.

7 Claims, 6 Drawing Sheets

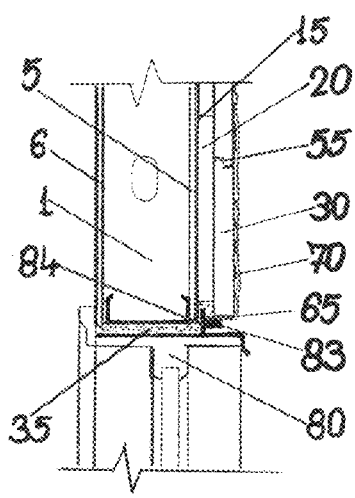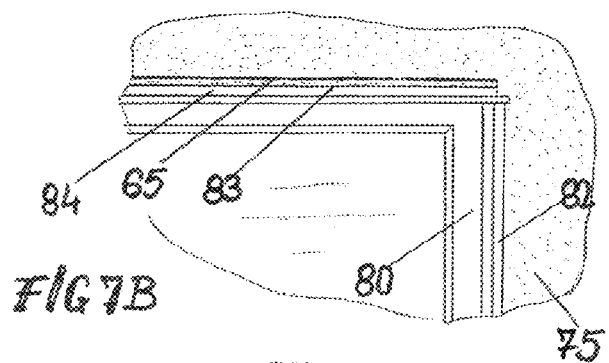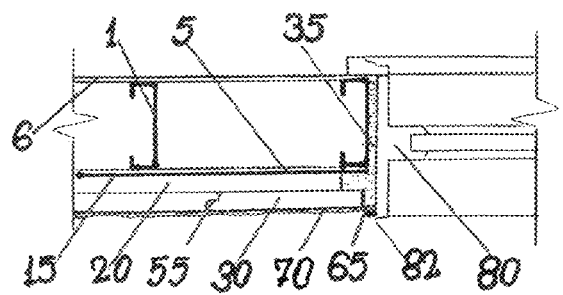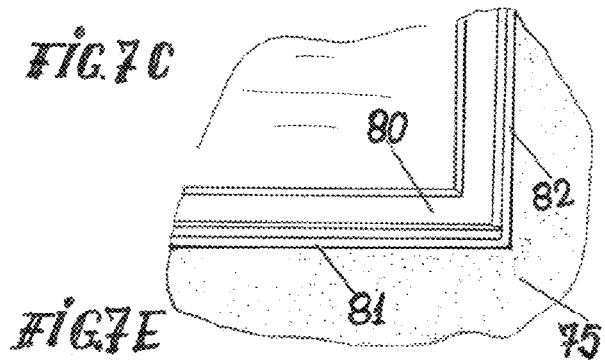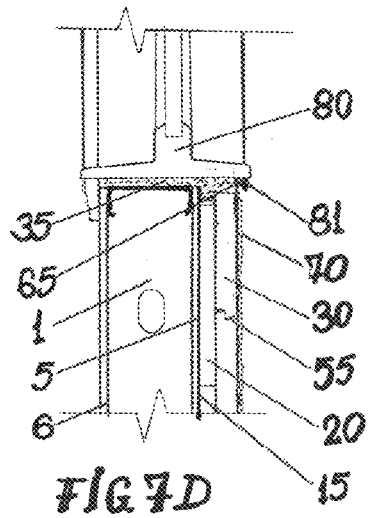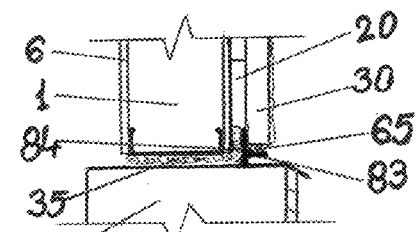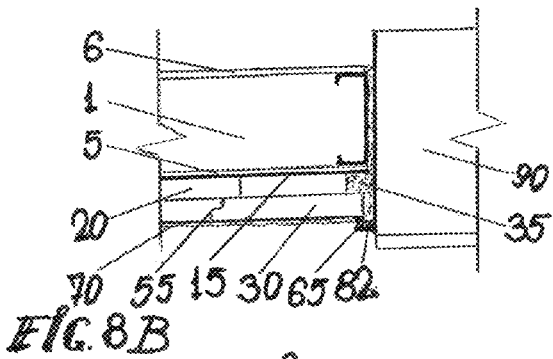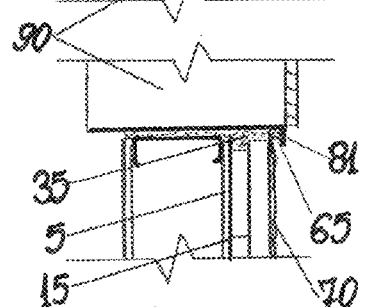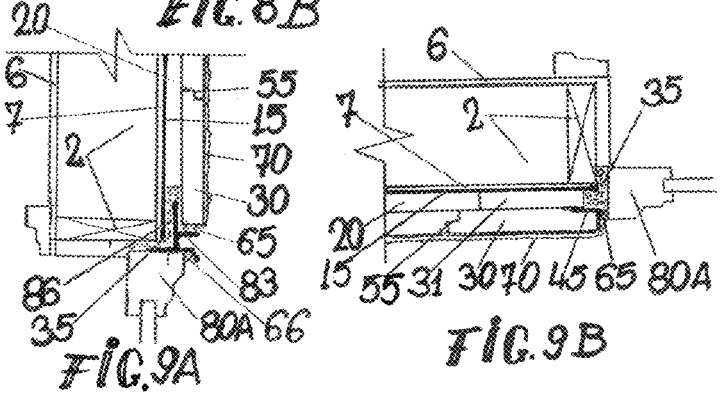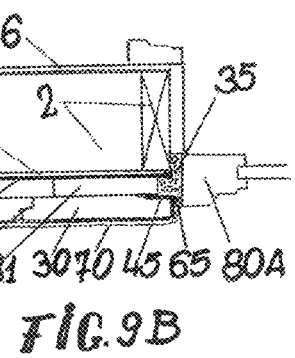

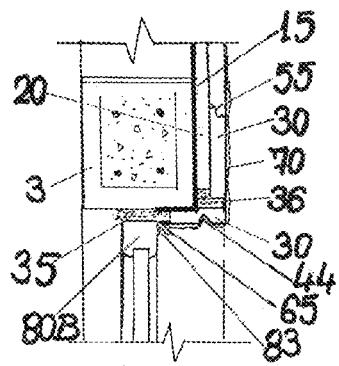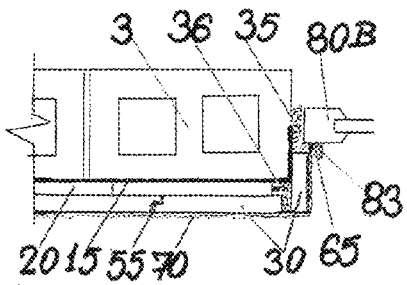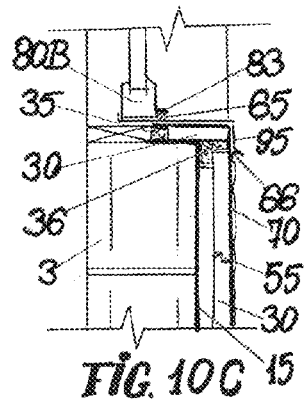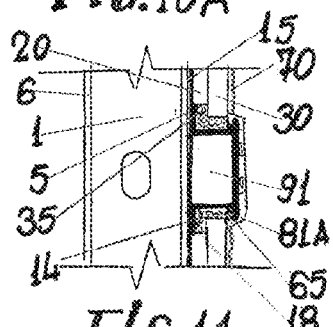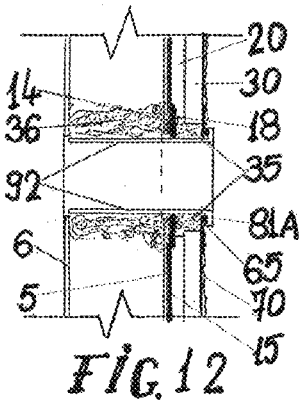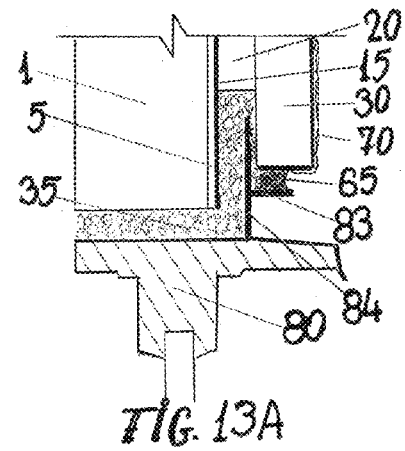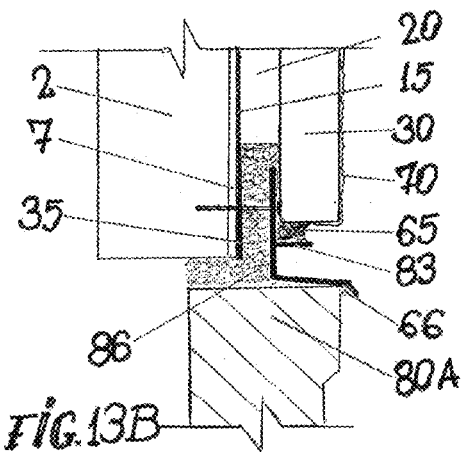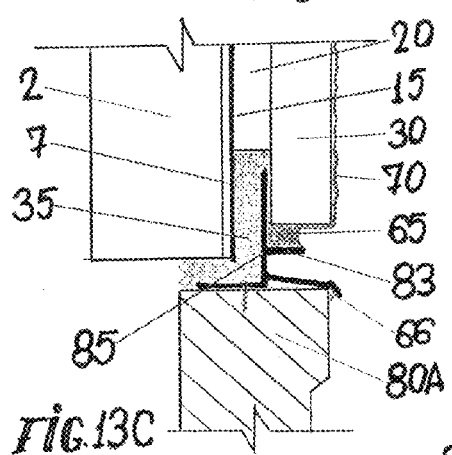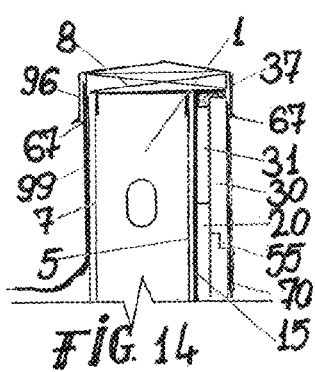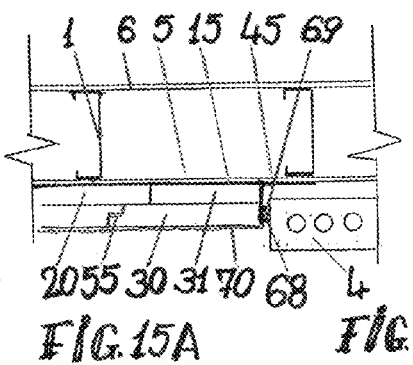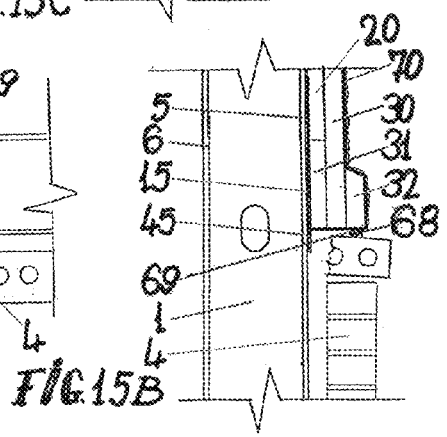

NP-EIFS NON-PERMISSIVE EXTERIOR INSULATION AND FINISH SYSTEMS CONCEPT TECHNOLOGY AND DETAILS

FIELD OF THE INVENTION

This invention relates to a new concept of the permissive exterior insulation and finish systems, to transform these systems into a non-permissive to water, air and vapor, exterior insulation and finish system.

BACKGROUND OF THE INVENTION

Exterior Insulation and Finish Systems (EIFS) are well known in the art. Such systems typically consist of a layer of substrate such as plywood, oriented-strand board OSB, gypsum sheathing etc, an insulation layer such expanded polystyrene, mesh embedded in a coat of polymer modified cement and polymeric finish. Originally, EIFS was an exterior wall concept designed to have high insulation values and a reliable stucco finish that could be economically created in a wide array of textures and colors. Generally, these systems include an exterior wall having an expanded polystyrene foam insulation board EPS, attached via an adhesive or mechanical fasteners to the substrate. The exterior of the insulation, after all details specified by architect such moldings, bands, structural or aesthetical joints are created, is covered with a durable water resistant basecoat, which receives a fiberglass mesh as reinforcement. A durable finish coat, typically using an acrylic co-polymer technology, is then applied. The finish coat is generally both color fast and crack resistant.

EIFS, which is a type of cladding for exterior building walls, is defined per ASTM E631-91B as a: non-loading outdoor wall finish system consisting of a thermal insulation board, an attachment system, a reinforced basecoat, exterior joint sealant, and a compatible finish.

While such EIFS have proved to be quite satisfactory for ease of installation, insulating properties, and ability to receive a variety of aesthetically pleasing finishes, a serious and vexing problem associated with EIFS construction exists. This problem is one of water accumulation behind the exterior wall covering. Such water it's considerate to be the result of condensation and wind-driven water that may enter behind the exterior wall covering at any point where the exterior surface of the coating is penetrated. Moisture is driven through the porosity of exterior polymer cement and finish coat surface and through air-permeable insulation (EPS) by the difference pressure of cold air and hot air. The air-permeable insulation is exposed to permit air to flow into and out of the insulation layer, to equalize the pressure of exterior environment and inside cavity of wall. This flux of air will drive moisture into the system. Wind-driven water that may enter behind the exterior wall covering may be the result of poor workmanship or design, deterioration of flashing or sealants over time, lesser quality doors and windows, or any other penetration or compromise of the exterior finish.

Once inside the sealed wall and behind cladding, the water can remain trapped long enough before evaporating to damage or rot any water sensitive elements to which the insulation is bonded, including framing structure. This water is known in the art as intruding or incidental water.

To eliminate those inconveniences, the EIFS industry created drainable systems. Drainage is accomplished by means of channels formed by vertical ribbons of adhesive applied to the back of the insulation boards or channeled EPS boards to form channels for incidental moisture to escape. The moisture and intruding water travels between the ribbons to the bottom termination of the system where it escapes through weep holes of the drainage vented track. This system is installed over a water and moisture resistive barrier.

Drainable systems have difficulties when it needs to drain water among windows, and when vertical walls end with ceiling or beam. Soffits have no solutions to drain condensation water. In addition, the moist environment is a breeding ground for wood consuming insects and health hazards such as various varieties of molds. Attempts have been made to prevent entry of moisture into the building wall interior by sealing or caulking entry points in and around wall components as the primary defense against moisture intrusion, or by installing flashing around the wall components to divert the moisture. These attempts have not been completely successful. Sealants are not only difficult to properly install, but tend to deteriorate and separate from the wall components due to climatic conditions, building movement, the surface type, or chemical reactions. Flashing is also difficult to install and may tend to hold the moisture against the wall component. Flashings are thermal bridges from outside temperatures and sources of airflow into the wall cavity. These materials are of no value in addressing the problem of moisture that has already entered a building wall cavity or moisture that penetrate the permeable EPS board and condensate on the moisture barrier surface.

The superior energy efficiency and design flexibility of EIFS have resulted in growing popularity, but the presence of moisture remains a vexing problem. Thus, there is a great need for a system and method to prevent and stop moisture to penetrate the insulation layer and intersections of EIFS whit other elements.

For that, we have to fully understand the phenomenology of interior and exterior environment difference, such as temperature, relative humidity and pressure, the conditions of condensation and physical properties of materials such permeability, permissively, thermal conductibility and others.

That part of any building that physically separates the exterior environment from the interior environment is called the building enclosure or building envelope. Also, the building enclosure may contain, but is not the same as, the so-called thermal envelope, term that is used to refer to the thermal insulation within the enclosure. The overall enclosure is made up of all the contiguous enclosure sub-assemblies. Further down, NP-EIFS is considered the thermal envelope of the enclosure.

Building assemblies need to be protected from wetting via rainwater, groundwater, air transported water and vapor diffusion. The typical strategies use drainage planes on air barriers, air pressure control installed between insulation system and exterior wall assembly indifferent of climate location and season. Moisture usually moves from warm to cold, driven by the thermal gradient (vapor pressure differential), and from more to less, driven by the concentration gradient. In cold climates, moisture from the interior flows towards the exterior by passing through building enclosure, in hot climates, moisture from the exterior flows towards the cooled interior by passing through the building envelope. By climates and seasons we can have two extreme situations from the exterior environment: very cold and dry, and hot-humid, with the same inside conditioned space, limited to 60% relative humidity at 75° F. (23.8° C.), both applied to a building having drainage EIFS cladding.

In cold climates, moisture from interior flows towards the exterior, driven by a high vapor differential pressure between interior (75° F. Temperature, 60% Relative Humidity), and exterior (−4° F. Temperature, 30% RH). Absolute humidity (water vapor concentration) is the driving force. Water vapor molecules will wend their way through porous materials until they reach the moisture barrier. In cold and very cold climates, condensation on interior surfaces occurs during the heating season because the interior surfaces of exterior walls are cool from heat loss. Because, on this situation, EIFS is placed on the cold side of building, the wall assembly is warm, including vapor retardant material of moisture barrier. This will equilibrate temperatures, air pressure and relative humidity from inside conditioned environment and wall cavity. Condensation is avoided by reducing water vapor entering the building components and preventing it from dropping below the dew point. Theoretic, if insulation thickness is in accordance with local climate, the only reason of condensation is the thermal bridges around windows, doors, flashings and other outside penetrations. Practically, any material with high conductibility or air leakage from outside can cause condensation.

In hot-humid climates and seasons, moisture from the exterior flows towards the cooled interior by passing through the building enclosure, condensation occurs because interior surfaces are typically cold and subsequently accessed by moisture levels, which are too high. Vapor is driven inward through building cladding by a high vapor pressure differential between exterior hot and humid air (120° F.; 100% Relative Humidity; 11.74 kPa Vapor Pressure) and interior wall assembly (75° F.; 60% RH; 1.82 kPa VP), cooled by inside air conditioning. The cold surfaces in hot climates arise from the air conditioning of enclosures. When exterior hot air is cooled, its relative humidity increases. If the exterior hot air is also humid, cooling this air will typically raise its relative humidity above the dew point. When cladding is drainage EIFS, vapors are driven from outside hot environment through exterior surface of the coating which is porous, and through expanded polystyrene foam (EPS) used as insulation which is permissive to vapors, and will condensate on the cold surfaces of moister retardant material, used as air and water barrier. This is the condensation surface, which became the drainage plane. Cooling the enclosure and the exterior sheathing substrate from inside conditioned space, and moisture contact with this surface, will create most propitious conditions for condensation behind EIFS cladding. In the summer time, we have the opposite situation from winter, when the insulation is placed in the warm side of the wall. The wall assembly is not properly protected from inside heat loss (cold loss), because the wall assembly materials are thermal conductive, metal or wood studs become thermal bridges, and fiberglass insulation from inside of the wall cavity is too permissive to air pressure differential between cold and hot. That is, in regions with varying climatic temperatures, the location where the dew point occurs and where the resulting moisture condensation forms in the building enclosure varies.

Accordingly, one of the most practical solutions in controlling condensation and mold behind EIFS and inside enclosure in all climates is limiting hot and humid exterior air or other forms of moisture transport from contacting the moisture retardant material used as air barrier, the condensation surface. Controlling the vapor pressure at this surface is the most commonly facilitate to maintaining the conditioned space at a slightly positive air pressure to the exterior (approximately 2, 3 Pa). Pressurization of building enclosure is expedited by airtight construction: 2.00 l/(s-m$^2$) @75 Pa.

The present invention relates to an EIFS cladding, having two air and vapor barriers. First air-vapor barrier is the classical weather barrier that guard sheathing from incidental moisture, improved to be Class 1 Impermeable (0.1 Perm), test procedure for vapor retarders: ASTM E-96 Test Method A. The moisture retardant material used as air barrier must be a continuous air and moisture barrier, a liquid membrane applied to the substrate, the entire inner layer of NP-EIFS. Second, the air-vapor and watertight barrier is even the insulation layer. The NP-EIFS foreseen the outer insulation layer to be closed cell extruded polystyrene thermal board XPS, which is a material with minimum of water absorption and vapor permeance. Rigid closed cell extruded polystyrene XPS is conforming to the following properties, per inch (25 mm) thickness: Thermal Resistance. R-Value 5.0 (ft$^2$h° F./Btu) min. at 75° F. Mean Temperature (ASTM C-518); Water Absorption 0.1% by volume, max. (ASTM C-272); Water Vapor Permeance 0.8/0.2 perm (ng/Pasm$^2$) (ASTM E-96): no capillarity. The variability observed in data obtained from testing laboratories using ASTM E-96 has recently become a concern. Although, most laboratories are performing analyses in accordance to the test method, the interpretation of the method has resulted in a variety of techniques for sample assembly and data evaluation. Vapor Permeance (Tendency of material to allow water vapor to diffuse through it) or Water Vapor Transmission is dependent on thickness of material. For 1½ inch (38 mm). XPS can be considered an air and vapor barrier. The classical EIFS uses as insulation expanded polystyrene boards EPS, which is on Class 3, Semi Permeable (1.0-10 Perm) or extruded polystyrene boards (EMS Class PM) but not assembled to be an air-vapor barrier for exterior environment.

Air and moisture barriers are systems of materials designed and constructed to control air and vapor flow between the conditioned space and unconditioned space. Air barrier systems are assembled from materials, incorporated in assemblies that are interconnected to create enclosures. Each of the three elements has measurable resistance to air flow. The minimum resistance or air permeances for the three components are specified in the art: Material 0.02 l/sm$^2$; Assembly 0.20 l/sm$^2$; Enclosure 2.00 l/sm$^2$; at 75 Pa.

It is therefore an object of the invention to provide a method and technology of application of materials, to create an assembly with similar vapor permeance and airflow resistance as the materials components. Moisture retardant properties of XPS will be extended to the entire wall assembly, creating a Non-Permissive to water, air and vapor thermal building envelope of the enclosure.

Another object of the invention is to provide waterproof and air/vapor-proof details, using patented closed cell, expanding polyurethane foam to fill all spaces between insulation and intersections. Also, invention presents a new concept of flashing and sealant application around windows/doors and other constructive elements to avoid thermal bridges and air leakage inside thermal envelope and inside wall assembly. The Non-Permissive thermal envelope assembly will be combined with the intersections of construction elements and terminations, to create Non-Permissive enclosures.

A still further object of the invention is to provide a waterproofing, vapor barrier and air leakage rates similar to Class 1 Impermeable, inside EIFS cladding, with chipping the standard of the industry by fulfilling requirements for design freedom, and increasing energy efficiency, weather ability, durability and beauty, with similar cost effectiveness.

NP-EIFS is a Class PM (polymer modified) system, which offers high impact protection, excellent energy savings and a durable, aesthetically pleasing finish.

SUMMARY OF THE INVENTION

The exterior wall assembly of this invention comprises an outer weather-resistance coating, heat insulation layer impermeable to water and vapors, 1½ inch (38 mm) thickness closed cell extruded polystyrene foam rigid boards XPS, with shiplap edges sealed, which create a continuous air and vapor barrier, a trowel applied vapor and air barrier on a wall substrate sheathing situated interiorly to the insulating layer and an attaching system using stick polyurethane foam, one-component adhesive to create a strong, permanent bond between substrate and insulation layers and to attach other exterior design elements. Fill spaces between walls frame and windows, doors, air conditioning frames and all wall penetrations, spaces between not shiplap edges of XPS boards and corners and encapsulate insulation board edges to starter track, casing beads and other terminations, with expandable polyurethane closed cell foam, bond and seal every XPS joints and surfaces resulted after fill spaces and plane the extra expanded foam, using weather seal, trowel applied, flexible polymer-based, non-cementitious waterproof membrane and air/vapor barrier.

In accordance with one aspect of a first present elementary embodiment, a non-permissive to water and vapor type of exterior insulation and finish system for buildings is provided. The system is applied over approved sheathing substrate, which is almost all substrates: steel or wood framing covered with fiberglass faced exterior gypsum, plywood or oriented strand board OSB, brick, unit masonry and poured or pre cast concrete.

A 100% acrylic based, trowelable waterproof membrane and air/vapor barrier must be continuously applied over the entire substrate surface. Before applying the continuous membrane, a 4 inch strip of reinforcing fabric or 2-3 inch reinforcing mesh must be applied to all sheathing joints, inside and outside corners, and all exposed edges at terminations, embedded with a stainless steel trowel on the acrylic based liquid membrane material. Such a membrane is sold commercially under the trademark of all prestigious EIFS material products companies such as Dryv'it®, Parex®, Sto® and others. At the same time, not vented tracks are installed on the start edge of NP-EIFS. In a further embodiment of the invention, the expansion joints, which are preferably plastic, may be variously constructed for attachment and cementation to the substrate and air-vapor resistant layer and to accomplish the principle of non-permeability.

The problems of the prior EIFS have been overcome by the instant invention, which provides a moisture and vapor barrier on the exterior of EIFS cladding, consisting of using extruded closed cell polystyrene foam boards XPS, as exterior insulation and water, air and vapor barrier. This material is impermeable to water and is vapor retardant, having less than one Perm Water Vapor Permeance (ng/Pas$^2$) per inch. Because permeance is tendency of material to allow water vapors to diffuse through it, and is dependent on physical properties of the material (permeability) and thickness of material, this invention confined the minimum thickness of XPS boards to 1½ inch (38 mm). The properties of XPS boards, which have insignificant permeability, accommodated with an installation system which extend the material properties to the assembly, together with bonding and sealing the intersections and terminations, provide a non-permissive thermal envelope of the enclosure, the NP-EIFS cladding.

The present invention relates about two NP-EIF Systems, one consisting in direct applying the non-permissive assembly layer of XPS boards to the air and vapor barrier continuously applied to the substrate, and a second system consisting in interpolation of a layer of expanded polystyrene foam EPS boards between air and vapor barrier of substrate and the exterior non-permissive layer of XPS insulation assembly. Both systems have their own advantages.

The first system, consisting in direct applying the thermal, water and vapor barrier, XPS assembly layer, directly to the air and vapor bather of substrate, have the advantage of faster installation with lower cost, and easily seal the terminations. Terminations of NP-EIFS are very important for the system because there can be sources of air/vapor leakage inside insulation. Another advantage is that, the space where air can exist inside NP-EIFS is minimum, so the air pressure and vapor relative humidity inside insulation have no significant effects. If the dew point is reached inside NP-EIFS cladding, without air and vapors change with the exterior or interior environment, the vapors billet inside cladding have no negative effects to material assembly.

According to this, a layer of XPS boards, 24"×48" (610×1219 mm) or 24"×96" (610×2438 mm) with step back edges, is applied. The XPS insulation boards are installed in a running bond pattern, using one-component polyurethane stick foam. These adhesives are designed to create a strong permanent bond between various building materials, and cure when ambient moisture in the air reacts with the adhesive. This is a reason to not use the classical polymer modified cement adhesive, which is water based. That water and moisture can remain inside NP-EIFS, behind XPS insulation assembly. The new system, does not allow any pierce of XPS non-permissive insulation layer, so installation of XPS boards with mechanical fasteners is impermissible. The single adhesive and sealing layer adhesively secures the insulation to the substrate.

A space of ½-1 inch (13-25 mm) is required around every intersection of insulation with elements that penetrates the wall assembly such as windows, doors, air conditioning boxes, pipes, vents, and even the penetrations of insulation, such as electrical panels or other elements attached to the sheathing. The same space is necessary between insulation layer and tracks, expansion joints profiles, and parapet terminations. A gap of about ½ inch (13 mm) is required between XPS boards, which create interior or exterior corners, and any other XPS boards, which are not shiplap joined. This space is to be filled with closed cell, one or two components expanding polyurethane foam sealant. Polyurethane foam sealant is applied with a professional dispersion unit (foam gun) or hose kit, to seal and fill cavities, break-through and gaps between wall with the insulation layer installed, and windows/doors, air conditioner and other constructive elements. The foam has strong adhesive, good stability and will adhere to material such as: metal, plastic, wood, concrete, masonry and naturally, extruded and expanded polystyrene foam. After solidification, it has the sealing, the heat preservation, the caking, sound-insulating, waterproof and other functions, being the most effective unifying component for the completion of an effective air-vapor barrier system.

Windows and doors are components that are assembled from elements. Where elements join together at a joint, a potential for water and air leakage exist. Metal or plastic flashings above windows and doors are usually interconnected with water repellent materials (house wrap, sheet membranes) or drainage planes to provide drainage of water to the exterior of the building. Under the flashing is sometimes a source of air leakage inside wall cavity and every time a thermal bridge between exterior environment and insulation substrate. It is therefore an object of the invention to provide moisture protection, stop air and vapor leakage around opening elements, and to eliminate thermal bridges in flashing areas, together with water control in the NP-EIFS. To achieve this, flashing may be remote from substrate, and the gap between window/door, flashing and wall opening and sheathing to be filled with closed cell expanding polyurethane foam sealant. Ideally, flashings and the elements to receive sealant should be designed and assembled in common with the window/door or other constructive elements frame.

Polyurethane foam sealants are tack free within 10-15 minutes. After solidification, the extra foam needs to be cut and rasped. The next step is to cut aesthetical and control joints. Creating joints and reveals on extruded polystyrene (XPS) and expanded polyurethane foam is easy as cutting joints in expanded polystyrene (EPS) but a little slower, and use same EIFS tools such as hot knife or plate hot knife.

To have an impermeable and non-permissive to air and vapor pressure system (NP-EIFS), seal with closed cell expanding polyurethane foam and stick the lap joint edges of XPS boards, is not enough. To create a non-permissive assembly with non-permissive elements is necessary to seal every XPS joint and every surface of polyurethane foam displayed on the outside of insulation. To seal XPS joints and expanded polyurethane foam surfaces, the same material as for treating sheathing joints is applied. Materials such Backstop® NT from Dryv'it® or WeatherSeal from Parex® are polymer-based, non-cementitious trowel applied, waterproof membrane and air barrier, and are designed to be used in conjunction with EIFS systems. These materials are extremely flexible, can bridge hairline cracks and accommodate small movements, but water vapor transmission needs to be improved to a lower permeance, for NP-EIFS. Apply this sealant to every not track terminations, after stick self-adhesive detail mesh on XPS edges and air-vapor membrane of substrate, which exceed NP-EIFS limit. The coating dries quickly and serves as an excellent surface for adhesively applying lamina, or other decorative elements.

The design options of NP-EIFS are virtually endless. The impermeable stratum assembly, with control and aesthetical joints, and terminations sealed, can receive now various aesthetical effects. Expanded polystyrene can be cut or grooved in various shapes and patterns, is very light in weight and installs easily over XPS layer with polyurethane stick foam.

Polymer-modified cement (basecoat) is applied, and high alkali-resistant reinforcing mesh is fully embedded in the basecoat. This includes diagonal mesh patches at corners of openings and reinforcing mesh patches at joints of track sections. Apply multiple layers of basecoat and mesh where required for specific impact resistance classification. All penetrations shall be embedded in closed cell expanded polyurethane foam sealant and terminations of the system must be made weather and vapor-tight, the insulation board edges shall be encapsulated by either casing beads and polyurethane foam sealants or edge wrapping with weather/vapor-proof membrane to the substrate. This extra adhesive and tightness of edges and terminations make impossible and also it is unnecessary the back wrapping of openings and terminations.

Caulking sealants for perimeter seal around window/door frames and other wall penetrations shall be applied in spaces constructive created, between flashing caulking-member or window/door/other caulking-member of frame and the basecoat reinforced with mesh. This gap is smaller than classical joints around openings and does not penetrate the insulation system. Sealant backer rod is not applied on this system. The role of backer rod is taken over by closed cell polyurethane expanding foam with many additional benefits. Also, polyurethane foam installed around constructive elements will take over dilatations and contractions of insulation system and window/door/other frame.

It is an object of the present invention to provide a system for perimeter seal around every constructive element, which penetrate the wall and the insulation cladding, further called sealant ensemble system.

Primer is applied to basecoat surfaces. Primer is a water-based pigmented acrylic coating to prepare surfaces for finish. Primer may be omitted if is not required by the manufacturer's product data sheets for the specified finish coat or otherwise specified for the project.

Advantageously, the exterior layer is a stucco-type exterior finish, which is applied to the exterior surface, according to known procedures and techniques. Usually, finish coat is acrylic polymer-based synthetic finish, integrally colored and textured and is selected by architect.

The principal weakness in the first-described NP-EIFS, with directly applying the extruded polystyrene XPS layer is that, XPS are rigid boards, using polyurethane stick foam as adhesive without any fasteners, needs a perfectly flat surface. It is known in the construction industry that exterior wall surfaces are not always perfectly flat. Substrate surface irregularity shall be not more than ⅛ inch (3 mm) for sheathed substrate and not more than ¼ inch (6.4 mm) for masonry and concrete substrate within any 4 feet (1219 mm). Even with this inherent flatness, it is known that EIFS corrects many imperfections of wall frame and substrate, to become the final design of the building. Moreover, XPS boards are very difficult to be leveled by sanding and rasping. One solution to the problem has been to provide an extra layer of expanded polystyrene foam EPS boards, between the substrate continuous treatment with impermeable membrane, and the exterior non-permissive layer of extruded polystyrene foam (XPS).

In a further embodiment of the invention, a second NP-EIF System is presented, having the same stages, with an additional inner layer of EPS boards and terminations adapted to this system. After the continuous liquid membrane air-vapor barrier is applied to the substrate, the expanded polystyrene EPS is adhesively attached using polyurethane stick foam. EPS inner insulation layer can be attached using mechanical fasteners, especially on wood frames with plywood or OSB substrate. When the EPS insulation is laid onto the substrate, extensive sanding and leveling operations must be performed over the entire wall surface.

Expanded polystyrene EPS shall not be in contact with any terminations or penetrations such as: windows and doors, flashings, air conditioning and other wall components, tracks and constructive expansion joints, cornices and parapets, especially with exterior environment. When is installed, EPS shall keep at least 1½ inch (38 mm) distance around every wall components and to every wall termination. This space, with the gap of extruded polystyrene (XPS) layer, is to be filled with polyurethane closed cell foam sealant. On edges without tracks or casing beads, EPS can be replaced with 4-6 inch (101-152 mm) of XPS board, and edge wrapped to the substrate with reinforcing fabric, embedded in impermeable membrane material, before applying lamina.

The EPS layer is also necessary to accommodate building movements, contractions and dilatations, being elastic material, especially when NP-EIFS is applied to multi level buildings. The EPS layer also provides enough space above construction elements to embed the flashing in expanded polyurethane closed cell foam sealant and it adds another R-value of 3.85/inch, resistance to heat flow insulation.

Yet, the object of the invention is to provide an EIFS for a building that insures that wind-driven water doesn't penetrate the system and the dew point of the air occurs outside the EIFS cladding. On detailed description of the invention, care has been taken in the detailing of termination points such as flashings, sills, jambs, parapets, edges, corners and any opening or protrusion and elements which penetrate the wall in an attempt to make them impervious to water and moisture.

It is another object of the invention to provide a process for the installation of a non-permissive exterior insulation and finish system and also the sealant ensemble system for perimeter seal, in order to resist to the effects of water vapor transmission and absolute humidity differential (vapor pressure differential) of both inner and outer environmental effects, and also to eliminate the dew point inside insulation cladding.

Examples of the more important features of the invention thus have been summarized rather broadly in order that the detailed description thereof that follows may be better understood. There are additional features of the invention that will be described hereinafter and which will form the subject of the claims appended hereto.

BRIEF DESCRIPTION OF THE DRAWINGS

FIG. 7A is a cross-sectional view of above part of the window, taken generally along the line 1-1 in FIG. 6;

FIG. 7B is a front view of above corner of the window shown in FIG. 6;

FIG. 7C is a cross-sectional view of lateral part of the window, taken generally along the line 2-2 in FIG. 6;

FIG. 7D is a cross-sectional view of lower part of the window, taken generally along the line 3-3 in FIG. 6;

FIG. 7E is a front view of lower corner of the window shown in FIG. 6;

FIG. 8A is a vertical cross-sectional view of through the wall air conditioning unit showing the above flashing with the sealant ensemble system and caulking, and down part with seal and caulk, according to the invention;

FIG. 8B is a horizontal cross-sectional view of air conditioning unit showing the lateral sealing and caulking;

FIG. 9A is a cross-sectional detail view of above part of classical window frame, installed on wood frame with OSB substrate, having NP-EIFS wall covering and showing the installation of flashing and sealants, according to the invention.

FIG. 9B is a cross-sectional detail view of lateral part of a classical window frame, installed on wood frame, showing the sealant ensemble system;

FIG. 10A is a cross-sectional detail view of above part of a window frame, installed on masonry CMU wall covered with NP-EIFS cladding, according to the invention;

FIG. 10B is a cross-sectional detail view of lateral part of a window frame, installed on masonry CMU wall covered with NP-EIFS cladding, according to the invention;

FIG. 10C is a cross-sectional detail view of lower part of a window frame and metal sills, installed on masonry CMU wall, covered with NP-EIFS cladding, according to the invention;

FIG. 11 is a cross-sectional detail view of electrical box, seal and caulk, according to the invention;

FIG. 12 is a cross-sectional detail view of a sleeve wall penetration for pipes or other wall penetrations, according to the invention;

FIG. 13A is a further enlarged cross-sectional detail view of flashing area, showing the above part of a window having the flashing constructive attached, and also showing the sealant system;

FIG. 13B is a further enlarged cross-sectional detail view of flashing area, illustrating an accessory flashing, installed to a classical window frame with a distance from sheathing exterior surface, to create the gap for polyurethane foam sealant and insulation, and also showing the sealant ensemble system;

FIG. 13C is a further enlarged cross-sectional detail view of flashing area, illustrating another invented accessory flashing used in same circumstances presented in FIG. 13B, having a different construction and being installed directly to the above part of window and also showing the sealant ensemble system, according to the invention;

FIG. 14 is a cross-sectional detail view of parapet termination, according to the invention;

FIG. 15A is a horizontal cross-sectional view of NP-EIFS vertical termination, showing the change of insulation cladding with brick cladding;

FIG. 15B is a vertical cross-sectional view of NP-EIFS horizontal termination, showing the start of insulation cladding above brick, similar to FIG. 15A;

DETAILED DESCRIPTION OF THE INVENTION

Figure 1:
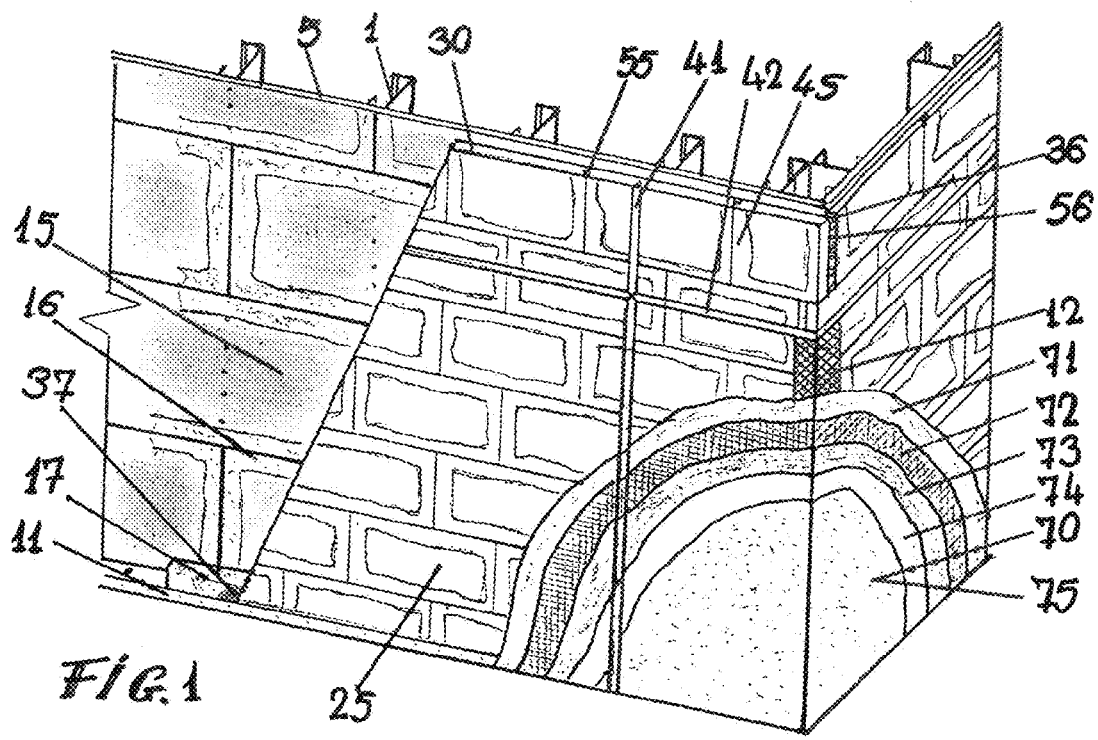
FIG. 1 is a perspective view, partially in section to show corner assembly, substrate preparation and interior detail of a non-permissive exterior insulation and finishing system (NP-EIFS) wall construction, showing use and installation of starter track, the non permissive assembly layer of closed cell extruded polystyrene foam boards XPS, vertical and horizontal control joints and the lamina, according to the invention.

The present invention provides an impermeable to water and non-permissive to vapors exterior insulation and finish system, generically called NP-EIFS. Unlike exterior insulation and finish systems known in the prior art, the EIFS of the present invention provides a double layer of water and moisture protection, one applied to the substrate 5, a liquid membrane 15, to be moisture barrier for inside vapors, and an exterior weather and vapor barrier 25, which is created with extruded polystyrene, closed cell foam, insulation boards (XPS) 30, special assembled 55 (FIGS. 5A-5B) and sealed 45, to create a non-permissive insulation envelope of the enclosure.

To ensure the success of this new system and concept, it is necessary to analyze the materials involved to create these systems, according to the invention.

The substrate shall be engineered to withstand applicable design loads and wind loads, and free of foreign materials such as oil, dust, dirt, form release agents, paint, wax, water, frost and other harmful materials. Acceptable substrate may be:

Glass Mat Gypsum Sheathing 5 conf. to ASTM C-1177;
  Cement Fiber Sheathing 5 conforming to ASTM C-1186;
  Exterior Gypsum Sheathing 5, minimum ½ inch (12.7 mm) thick, core-treated, weather-resistant, complying with ASTM C-79; installed over metal frame 1; or
  Plywood 7 Grade C-D or better, nominal ½ inch (12.7 mm);
  Oriented Strand Board (OSB) 7, nominal ½ inch (12.7 mm) minimum; installed over wood frame 2; or,
  Concrete poured or pre-cast and Concrete Masonry Units (CMU) walls 3 non-painted (uncoated).

Figure 2:
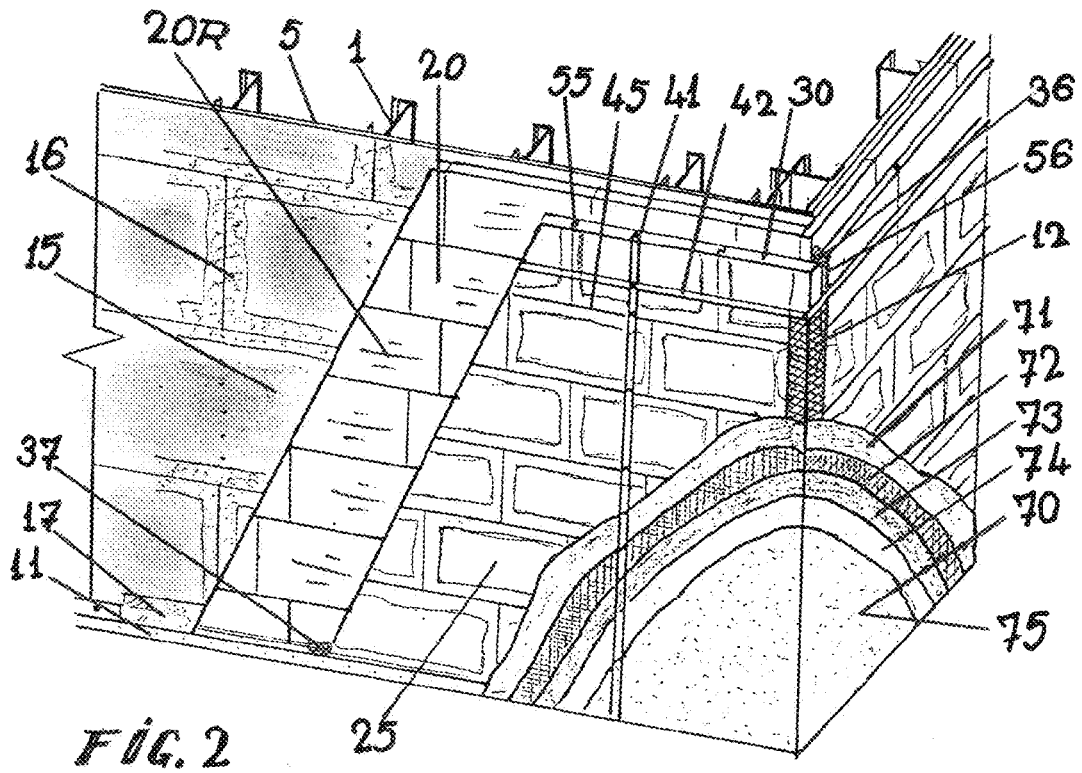
FIG. 2 is a perspective view of NP-EIFS shown in FIG. 1, having an inner extra layer of expanded polystyrene EPS (equalization and extra insulation layer), according to one embodiment of the present invention.
Figure 3:
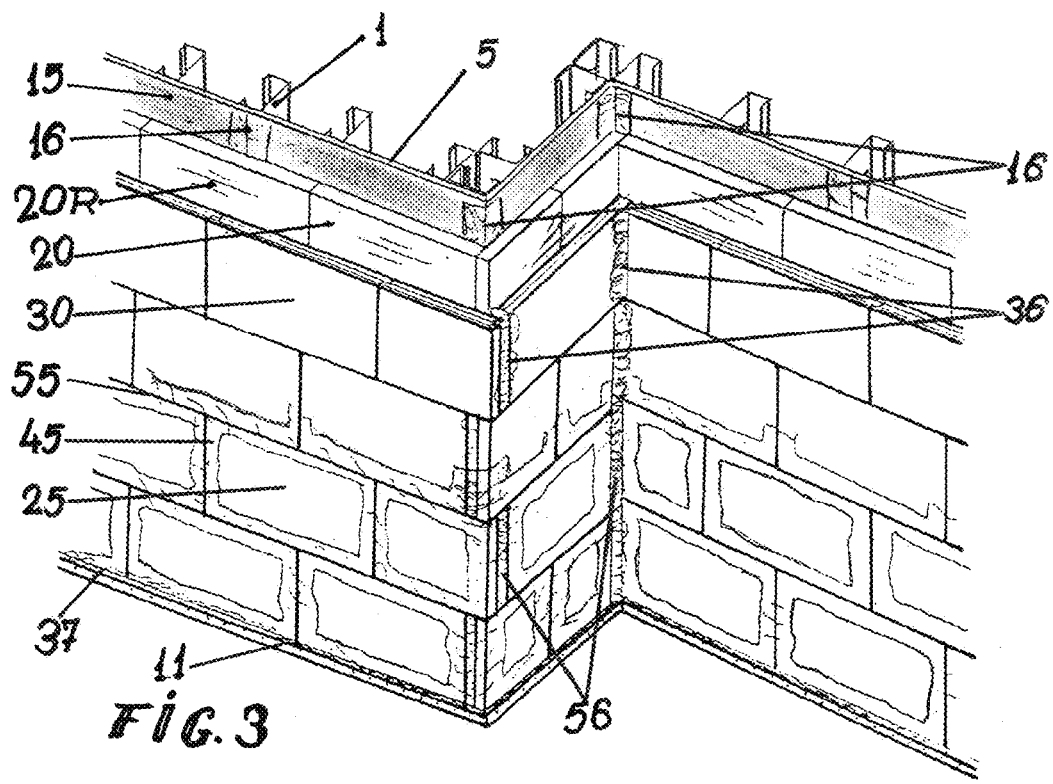
FIG. 3 is a perspective view of NP-EIFS wall assembly with progressive process of application, showing a wall frame member with air and vapor barrier, with situation of exterior and interior corners and stagger joints at all inside and outside corners, containing the EPS layer, before applying lamina (the exterior weather-resistant coating)

Sheathing board gaps shall not exceed ⅛ inch (3.2 mm) and the surface must be flat within ¼ inch (6.4 mm) in any 4 feet (122 cm) radius, CMU mortar joints shall be struck flush, especially for NP-EIFS without EPS layer 20 (FIG. 1), which accept rasping and leveling 20R (as shown in FIG. 2).

The next important material to use in this invention is the liquid membrane 15, polymer based, trowel applied to the substrate, air and vapor barrier. All sheathing substrate joints and inside and outside corners 16 and all exposed edges at terminations shall be treated with same or similar vapor retardant material 15 and reinforced with 2-3 inch self adhesive mesh or 4 inch fabric. In construction industry this water and air barriers are systems of materials designed to control airflow and become a line of defense against water intrusion and means to drain intruding water from exterior. A feature of NP-EIFS is to be impervious to exterior water and vapors, and the role of air-vapor barrier is to stop vapor diffusion from interior into the insulation system. Such membrane, trowel-on applied, water and air barriers, are sold commercially under the trademark of all prestigious EIFS material products, and have the following acceptable texture testing:

| | | |
|---|---|---|
| Water Resistance | ASTM D-2247 | no deleterious effects; |
| Elongation | ASTM D-412 | 114%; |
| Flexibility | ASTM D-522 Method B | passed; |
| Air Leakage | ASTM E-283 | 0.002 cfm/ft$^2$ at 75 Pa; |
| Water Vapor Transmission | ASTM E-96 Procedure B | 7 Perms |

The water vapor transmission need to be improve to a Class II Semi-Impermeable (1.0 to 0.1 Perm) or better, to be satisfactory for this system. The wall assembly has two more layers of air barrier and vapor retarder for inside vapors, one is the exterior gypsum wallboard 5 or plywood 7 with joints sealed 16 (Semi-Impermeable), and the interior gypsum board 6 with the interior latex paint or Semi-Permeable (1.0 to 10 Perm) textured wall finish. Also, concrete block 3 walls are vapor retardant and adsorb vapors in the diffusion process, having large moisture storage capacity. All wall materials allow the wall assembly to dry inwards.

The following material is the rigid, closed cell, extruded polystyrene thermal board insulation (XPS) 30, conforming to the properties as follow, for 1 inch thick:

Thermal Resistance at 75° F. Mean Temperature;

| | | |
|---|---|---|
| R-Value | ASTM C-518 | 5.0 ft$^2$h° F./Btu |
| RSI | | 0.88 m$^{2°}$ C./W |
| | ASTM D-696 | 3.5 × 10$^{-5}$ in/in° F. |
| | | 6.3 × 10$^{-2}$ mm/m° C. |
| Water Absorption; | ASTM C-272 | 0.1% by volume, max |
| Water Vapor Permeance; | ASTM E-96 | 0.8-0.2 Perm (ng/Pasm$^2$) |

The water vapor transmission (diffusion resistance), for 1½ inch (40 mm) thickness of XPS boards 30 it's close to 0.1 Perm, which is Class 1 (under 0.1 Perm) Impermeable. The natural conditions, even in hot-humid climates, don't meet the testing conditions, but for all contingences, manufacturers could improve extruded polystyrene to a lower vapor transmission rate (0.1 Perm or less). The XPS boards 30 need to be imprinted (not smooth) on both sides with dimple pattern.

Permeability values of materials are irrelevant in air and vapor barrier systems without a method to extend the characteristics of vapor retardant materials to the air-vapor barrier assembly. Air-vapor bathers are intended to resist the air pressure differences that act on them. Materials 15, 30, 35, 45, and the assembly 25 that meet impermeable performance requirements are said to be air/vapor bather assemblies. According to this, another object of this invention is to create a joint system 55, which can ensure the impermeability of XPS 30 boards assembly, to create the non-permissive assembly 25.

Figure 4:
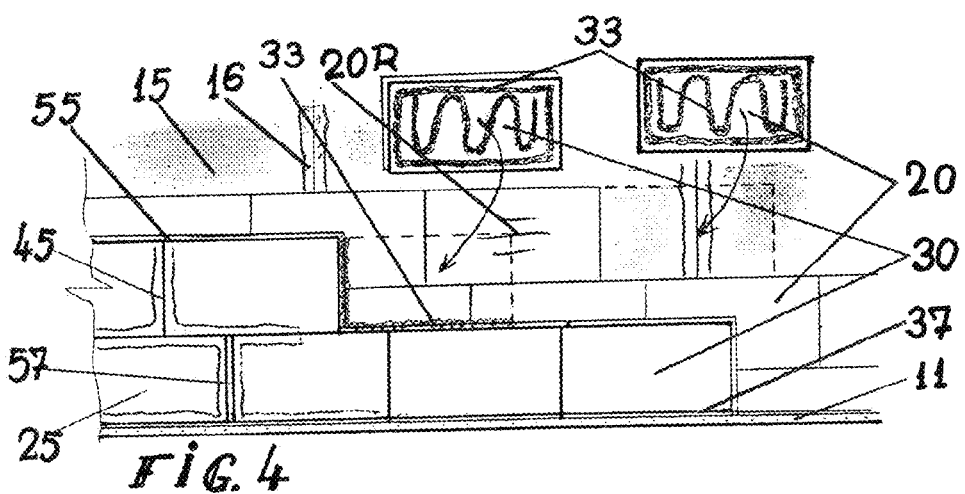
FIG. 4 is a plan view of NP-EIFS process of application, with EPS insulation layer, showing a starter track mounted on the air-vapor barrier, begin wall insulation with 1 foot (30.5 cm) piece of EPS board, to minimize insulation joints aligning with sheathing joints, and EPS with XPS board joints, and the adhesive applied on the back of both EPS and XPS boards, when are install, in running bond pattern.
Figure 5A:
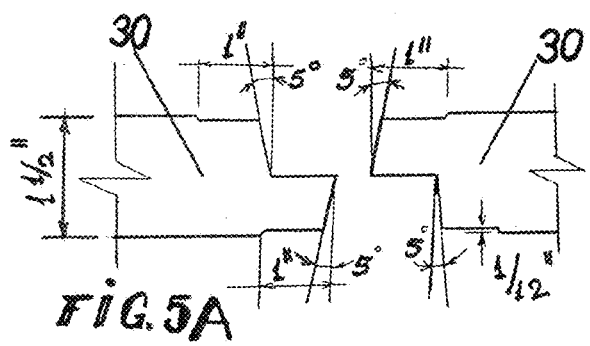
FIG. 5A is a cross-sectional of XPS boards edges, L-type with lap joint edges, modified to create a deep V-joint when are assembled, and a 1/12 inch (2 mm) retraction of about 1 inch (25 mm) around XPS board edges, to be sealed on exterior with water-vapor sealant material, and inside with polyurethane stick foam, according to the invention.

As shown in FIG. 5A the XPS 30 joints must be created as L-type with lap joint edges 55 redesigned, to form an −5° angle from a normal 90° angle, on both sides, with a retraction of ¹⁄₁₂" (2 mm) from inherent flatness, approximate 1 inch (25 mm) around XPS board 30. When the impermeable XPS boards 30 are assembled, FIG. 5B, the assembly will form two deep V joints, with 10° angle, inside and outside the non-permissive layer 25, around XPS boards 30. The inside space created is to be filled with polyurethane stick foam 33, the adhesive used to install the non-permissive layer 25. With reference to FIG. 4, a continuous girdle of polyurethane stick foam 33 is applied on the lower part of L-joint of XPS boards 30, which are already installed. Polyurethane foam adhesive 33 is formulated to have a low expanding rate, during the curing process, enough to fill and seal the back of XPS 30 joints generally designated at reference numeral 55. After the non-permissive layer 25 of XPS boards 30 is applied, either directly to the impermeable membrane 15, or to the additional EPS 20 layer, exterior deep V joints created between XPS boards 30 mast be filled with polymer based, water and vapor retardant material 45. This sealant material 45 can be same or similar to the liquid membrane material 15, or sealant material used to treat sheathing substrate joints and corners 16.

To ensure the applicability of NP-EIFS in real situations of creating the non-permissive layer 25, according to the invention, terminations, intersections with construction elements, interior and exterior corners 56, and other XPS boards which are not shiplap joined 57 (vertical), are pre-sealed with closed cell expandable polyurethane foam, applied to fill spaces in different situations: gaps around constructive elements (35), corners dovetailing (36), starter track and terminations (37) or expansion joints accessory (38). In use, polyurethane foam, when applied to form a seamless, monolithic dovetailing between all elements and materials, except shiplap joints 55 (FIG. 5B) have an extra expansion after curing, which need to be cut and rasped to the exterior level of XPS 30 layer. All of these areas of closed cell polyurethane foam sealant, apparent on exterior, will be coated with liquid membrane, sealant material 45. This sealant material 45, perform the function to complete the air-vapor and water barrier, over the non-permissive, thermal envelope 25, on all joint, intersections and termination areas. It serves as an extra sealant, over the closed cell polyurethane foam 35, 36, 37, 38 as well as acting to prevent vapor diffusion, air leakage and water penetration, as a first line of defense over the problematic areas.

To materialize sealant conditions of diffusion resistance and water impermeability, the vapor retardant, sealant material 45 must be a high performance, polymer-based, flexible, noncementitious, water resistive membrane, which resists vapor and water penetration and eliminates air infiltration. Such sealant material is sold commercially under the trademark of EIFS material products companies, is designed to be use in conjunction with EIFS systems, to create continuous trowel applied vapor retardant membrane (15) already described, with ASTM texture testing mentioned. The sealant material, generally designated at reference numeral 45, is a similar polymer based, liquid membrane product, but not necessarily identical. Particularly preferred material 45, for use in the present invention, improving the moisture diffusion and other properties of the aforementioned sheathing membrane material 15, must be designed to provide a face-seal, or barrier to seal out water and moisture, to have better adhesiveness to extruded polystyrene and better tensile strength and elongation. The recommendation: noncementitious" is because other similar products use cement, mixed in composition before application, for strength, but will lose in elasticity and flexibility. Tensile strength and elongation is a very important parameter for sealant material 45, to be able to take over contractions and dilatations of XPS boards 30, lamina 70, and other elements.

Moreover, a general reinforcing of all joints of non-permissive insulating assembly 25, with joints sealed 55, is applied on the outward facing surface. A layer of basecoat-adhesive 71 is applied to the outer surface and then lays the reinforcing mesh 72 into the uncured basecoat. A second coat of basecoat 73 is applied. As a result, the reinforcing mesh 72 becomes embedded in the basecoat. A local reinforcing of XPS boards 30 joints can be applied in sensitive areas such as corners 56, around windows and doors and on edge terminations, directly into the sealant material 45 using self adhesive mesh (not figurate).

Another key element and material of present invention is the aforementioned expanding polyurethane closed cell foam sealant, figurate in different situations and marked with numerals 35, 36, 37, 38. Applied to fill joints between not shiplap XPS 30 edges, such corners 56, or intermediary XPS dimensions joints 57, or to fill gaps between windows/doors frame 80, 80A, 80B and other wall penetrations 90, 91, 92 and frame openings, flashings 84, 85, 86 or accessories 10, 11, 12 and insulation edges 20, 30, polyurethane foam sealant 35, 36, 37 or 38 is the perfect choice for sealing needs, and may be used to fill, seal, bond and stop air and moisture infiltration.

Measurements using ASTM E-283 show that polyurethane foam sealant, when properly applied, reduces the air leakage rate to less than 0.01 cubic-feet/minute/square-foot (0.05 liters/second/square-meter), below accepted building code requirements. Water in its low energy stage (liquid), does not permeate through polyurethane closed cell foam, and in its high energy stage (vapor), its permeance is retarded significantly. Because of its very low moisture vapor diffusion properties, polyurethane foam may be considered a vapor retardant, when applied in sufficient thickness. Closed cell polyurethane foam has been tested according to ASTM E-96 at varying thicknesses, and has a permeance rating of approximately 2.6 Perms at a thickness of 1 inch. To compensate the difference between "vapor retardant" and "vapor barrier" of polyurethane foam monolithic coating, the sealant material 45 gives a linearly extrapolated perm rating of Class I impermeable, when it is applied over all polyurethane foam 35, 36, 37, 38 areas seen in exterior.

In using, the preferred specific material is the one-component closed cell polyurethane foam sealant, commercially available in specific formulations, including stick polyurethane foam 33, applied with a patented professional dispersing unit or professional hose kit. The one-component polyurethane foam is tack free within 10-15 minutes and meets ASTM E-84 Class1 for surface burning characteristics as caulking and sealant. Also, the two component closed cell expanding polyurethane foam sealant can be used.

In a further embodiment of the invention, the flashing 84, 85 or 86, another component of classical EIFS is redesigned as form, application, functionality and concept. This invention constitutes significant improvement in this regard to current drainage EIFS, which has watertight and mold problems. Terminations in the wall system around windows and doors have traditionally been the source of moisture entry. The classical flashing is mechanically fastened or nail attached to the substrate sheathing, being a thermal bridge between exterior cold air and insulation substrate 5, 7 and sets up a condensation area. Flashing is also an air leakage source, a result of the empty space between window/door frame and wall opening, together with vapors that break through classical EIFS cladding (vapor diffusion), being accomplished all conditions of vapor condensation.

According to the invention, NP-EIFS is generally designed to be impervious to water and vapors, excluding any intruding water, so that is why flashing is not designed and assembled to drain water from interior, but just sheds water to the exterior.

Figure 6:
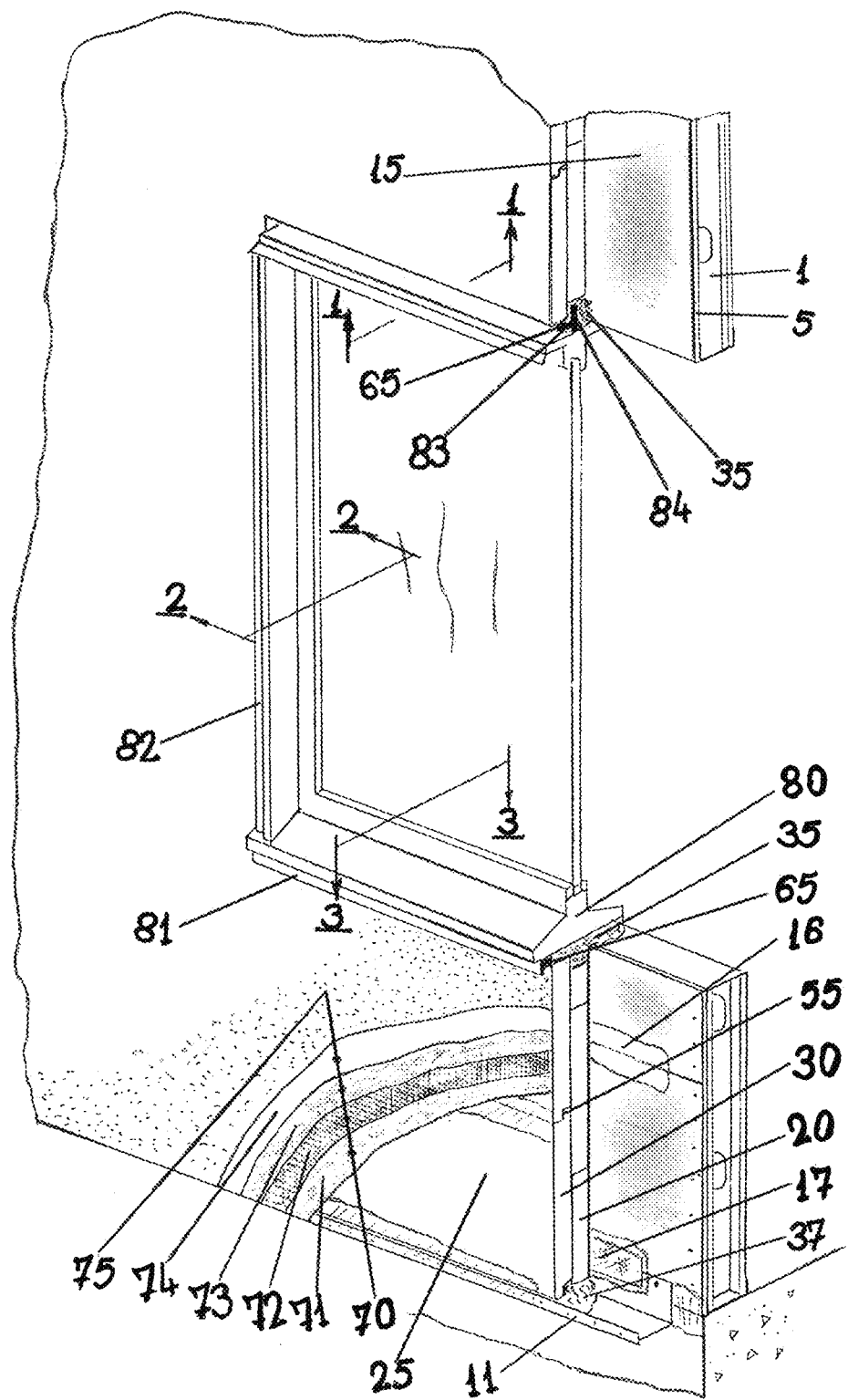
FIG. 6 is a perspective view, and cross-section to show a wall assembly with metal frame, sheathing substrate and NP-EIFS cladding, and illustrating the relationship between a window frame with constructive attached flashing and the sealant ensemble system, EPS and XPS insulation layers with the exterior lamina, and frame opening, according to the invention.

As seen in the perspective view of FIG. 6 and separately detailed in FIG. 13A cross-sectional detail, the element flashing 84, above windows and doors is constructive attached to the window/door frame 80. This is the ideal solution, when is eliminated the joint between construction element frame 80, 90 (windows, doors, air conditioning units), and flashing 84. The construction element 80 is mounted as so to have about 1 inch (25 mm) gap between the constructive attached flashing 84 back flange, and substrate sheathing 5, 7 continuously with the gap between construction elements 80 and frame opening. This gap must be continuous from inside to outside and around flashing 84.

The present invention is directed to be adaptable to classical window/door frame, and other construction elements, which comes in conjunction with NP-EIFS. As shown in the detail view of FIG. 13B, an attachable flashing (not constructive attached) 86, similar in construction and application with classical flashing, is acceptable to be used. In this regard, the flashing 86 is mounted with metal screws, about 1 inch distance from wall substrate 5, 7 interspersed a cupon of extruded polystyrene or special distance piece (not figured). Using mechanical fasteners to install the flashing 86, these it may be installed above the horizontal caulking element, and above caulking area 65.

Another flashing 85, contemplated to be agreeable for this invention is presented, cross sectional in FIG. 9A and separately detailed in FIG. 13C. This flashing 85 is similar to flashing 86, but has a different construction, so as the lower horizontal laid flange of flashing to be continued on the back of the flashing. This horizontal back laid flange is the area where the flashing is mechanically fastened to the window/door frame. Through this assembling, the flashing 85 became similar with the constructive attached flashing 84.

Flashings type accessory 85, 86 require sealant application 66 (FIG. 9A) on lower joint area of flashing 85 or 86 and window/door frame 80A, behind drip edge.

Thus, according to the invention, and seen in the perspective view of FIG. 6 and sectional detail views of FIGS. 7A (cross-sectional view, taken along the line 1-1 in FIG. 6), 8A and 9A a continuous gap around flashing 84, 85 from inside to outside of wall assembly is created, to be filled with closed cell polyurethane foam 35. The polyurethane foam sealant 35 is applied in two stages, first after the expanded polystyrene (EPS) 20 layer is installed, by filling the gap between window/door frame 80, wall frame opening, flashing 84, 85 back flange and substrate sheathing 5, 7, treated with the impermeable membrane 15, and second, after installation of extruded polystyrene (XPS) 30. If necessary, the gap can be filled from interior of building. The XPS boards 30 will be installed ½ inch (13 mm) above the horizontal caulking element 83 of flashing 84 or 85 and excess polyurethane foam is cut to that level, creating a space for silicone sealant 65. According to the invention, the polyurethane foam 35 seen outer is treated with joint sealant material 45.

As common element of all flashings used for NP-EIFS is the horizontal detail 83, perpendicular to back flange of flashing, situated about 1 inch (25 mm) above drip area, with a dimension of minimum ¾ inch (19 mm). Between this element 83 and XPS 30 edge it form a rectangular joint, which is the caulking area, separated from dripping area, for a better access in that difficult to access space, and to create a straight edge. The double layers of basecoat 71, 73, which embed the reinforcing mesh 72 it stop on back flange of flashing. The joint created is fill with low modulus silicone sealant 65. The back flange (vertical part) of flashing go up to the horizontal sealant element 83 about 2 inch (51 mm) to be embedded on polyurethane foam 35 and silicone sealant 65.

Immediately following and close related are the terminations on vertical sides and under sash of NP-EIFS, in conjunction with the windows/doors openings and other through-the-wall elements.

With reference to FIG. 7C (cross-sectional view, taken along the line 2-2 in FIG. 6) and FIG. 8B, the gap for perimeter seal around window/door frame 80 and other wall penetrations 90, continuously surround the constructive element on vertical sides, and is filled with closed cell polyurethane foam sealant 35, ensuring the continuance seal of joint between construction element 80, 90 and wall frame opening studs 1 or 2, and completely encapsulate insulation boards 20, 30 edges on polyurethane foam 35.

A similar embodiment of the invention is illustrated in FIG. 7D (cross-sectional view, taken along the line 3-3 in FIG. 6), showing the lower of perimeter seal, below window 80 sills, and below part of air conditioning 90, illustrated in FIG. 8A. In this case, the constructive attached element 81, which forms the caulking joint, becomes also the draining board, to drain pluvial water from exterior of construction elements 80, 90.

All surfaces of closed cell polyurethane foam sealant 35 apparent on exterior, are cut, rasped and leveled (using leveling/sanding tools) to the exterior surface of non-permissive insulation layer 25, and treated with sealant material 45, according to the invention.

The attractive feature of the present invention, and indicated above, the constructive attached elements 81, 82, 83, which form the limit of caulking joint, as described and shown in the drawing figures, is but a preferred embodiment.

The silicone sealant 65 is applied after the first part of lamina 70 is dried (flexible basecoat 71 and fully embed reinforcing mesh 72 in basecoat 73) and before finish coat 75. Sealant for perimeter seal 65 around window/door frames 80 and other wall penetrations 90, 91, 92 shall be low-modulus, designed for minimum 50% elongation and, minimum 25% compression and shall conform to ASTM C-920, Grade NS.

An important technical aspect is that, thermal dilatations and contractions of constructive elements and EIFS cladding and also building movements occur. To avoid major cracks in lamina, control joints are recommended by codes and located so as monolithic wall areas to not exceed 144 ft$^2$ (13.4 m$^2$) and dimensions between horizontal or vertical control joints to not exceed 12 ft (3.23 m). The new invented system is bond attached in intersections to the constructive elements (80, 90, 91, 92) and the thermal, hygric and movement stress is dissipated in the sealing area. Expanding polyurethane foam 35 and non-vapor-permissive sealant material 45 are elastic materials, which can accommodate small movements, compressions and elongations. Constructive elements that penetrate the wall or NP-EIFS cladding (80, 90, 91, 92) and the outer coating named Lamina 70 experience the most important thermal and movement stress. In the most fundamental sense, a crack is stress relief. In this sealant system, a crack is anticipated in intersections of lamina 70 with other constructive elements, around the perimeter. This crack is situated below caulking elements 81, 82, 83 and is sealed and encapsulated (minimum ¾ inch) with silicone sealant 65.

The key to moisture control is the control of air transported moisture and incidental water around wall openings and penetrations, which form the Sealant Ensemble System. This invention constitutes significant improvement in this regard to current EIFS, the NP-EIFS provides and interconnects sealant materials with low permeability values, special assembled to create an impervious sealant ensemble system around wall openings as follows, from interior conditioned space to exterior environment:

- 15 air-vapor barrier, polymer based, trowel applied to the entire substrate sheathing surface, with sheathing joints sealed 16, and terminations 17, 18;
- 25 exterior air-vapor barrier, a non-permissive to vapor diffusion and weather resistant insulation layer, consisting in a special assemblage of extruded polystyrene XPS boards 30, with shiplap joints sealed 55;
- 35 closed cell polyurethane foam sealant, continuously applied around openings, from interior to exterior, which stick, seal and insulate the back flange of flashings 84, 85 or 86 and encapsulate XPS 30 and EPS 20 insulation board edges;
- 45 water and air-vapor retardant, a high performance polymer-based sealant material, trowel-on applied over outside surface of polyurethane foam sealant 35 and interconnection with the non-permissive assembly 25 (XPS board 30 edges);
- 55 the seal of joints of XPS boards 30 in the process of creating the non-permissive assembly 25;
- 65 low modulus silicone sealant, continuously applied, provide water-vapor tight performance and encapsulate the edge of reinforcing mesh 72, fully embedded on flexible basecoat 71, 73;

75 the outer layer of the rain screen or lamina 70, a superior elastomeric finish, applied after silicone sealant 65, create the look of the building and offers protection for the inner layers and insulation envelope components;

85, 86 or 84 flashings and 81, 81A, 82, 83 constructive elements of window/door frame 80 and other wall and insulation penetrations 90, 91, 92, which surround the element to create a caulking joint.

The new Sealant Ensemble System around openings, described above, advantageously replace the classic system, which require a joint between the constructive element and insulation board edges, by completely separate EIFS from windows/doors and other elements. To create this separating joint, classic EIFS require a straight line around opening, insulation shall be held back from adjoining materials around penetrations such as windows, doors and mechanical equipment, a minimum of ¾ inch (19 mm), for sealant application, completely encapsulate insulation board edges by mesh reinforced basecoat and back-wrapping (continuation of reinforcing fabric around the edge of insulation board and onto the substrate in back of the insulation). The sealant system endorsed to seal the gap, (which is continuous free for air circulation between the interior of building and exterior environment) is a backer rod sealant, followed by silicone sealant for perimeter seal. Virtually, the silicone sealant is the only defense against unwanted water inside the wall cavity.

Having thus described elements of a standard EIFS installation, attention is invited to the fact that the subject matter of this invention is directed to a sealant ensemble system that offers multiple seals. Seal and bond the constructive elements 80, 90, 91, 92 to the wall frame opening (metal or wood studs 1, 2) with expanding polyurethane foam 35, over-seal the exterior surface for water and vapor penetration with sealant material 45 and caulking 65 applied on a specially created joint. The mesh reinforced basecoat 71, 72, 73 stop behind and under the caulking joint delimitation elements 81, 82, 83 without back wrapping (not applicable and unnecessary).

Also, drainable EIF Systems requires continuation of water/vapor barrier to the interior face of wall opening. Using the same liquid membrane material with reinforcing fabric to treat sheathing joints as for water-vapor barrier or flashing membrane, the rough opening (window, door, others) is protected from intruding water, and is configured to shed water to the exterior of the system. Installation of windows/doors and other elements come after EIFS installation, with many detail contradictions such as flashing installation above windows/doors and others or silicone sealant applied around constructive elements before finish coat (a code requirement).

According to the invention, windows/doors 80 and other elements 90, 91, 92 specially designed are installed prior to NP-EIFS, the polyurethane foam sealant 35 will seal all joints between the framing members 1 or 2 of the rough openings and substrate sheathing 5 or 7. Sealing these joints (the gap) is only for inside wall cavity vapors and to not permit inside vapors to permeate behind/inside insulation, and not to protect the system against precipitation or condensation water. Also, the polyurethane foam sealant 35 insulate the constructive element 80, 90, 91 or 92 which are considered a thermal bridge between exterior cold environment and wall frame 1 or 2 and sheathing 5 or 7, eliminating the dew point conditions in that area.

Referring now in detail to the accompanying drawings and particularly to FIG. 1, there is illustrate a wall assembly of NP-EIFS having the impervious layer 25 directly applied to the substrate sheathing 5 or 7. The building wall is generally constructed of a frame, which typically includes a plurality of studs 1, a sheathing 5, and an external wall covering (cladding). The NP-EIFS cladding presented on this invention, and seen in the perspective view, partially in section of FIG. 1, consist of a succession of components and application procedures. As is known in the relevant art, and above described, the sheathing board joints and corners 16 are treated with specially designed grid tape, completely embedded on air-vapor retardant material and an air-vapor barrier 15 is continuously applied over entire substrate surface. The air-vapor barrier 15 is an improvement to a lower vapor diffusion rate, under 1 US Perm (57.21 ng/Pasm$^2$), of trowel applied waterproof membrane and air barrier component, known in the EIFS industry. The non-permissive assembly 25 consisting in extruded polystyrene XPS boards 30 special assembled, with joints sealed 55 is then applied. Substrate 5 or 7 shall be examined for maximum deflections accepted for this system, in accordance with substrate material manufacturer's, specifications and applicable building codes.

FIG. 2 illustrate a similar representation of NP-EIFS having an additional inner layer of expanded polystyrene EPS 20, foreseen as equalization component. EPS 20, insulation layer is installed without gaps, in a running bond pattern and interlocked at corners, without superposition of EPS 20 joints with vertical or horizontal joints of substrate sheathing 5 and XPS joints 55. Preferably, the adhesive used to install additional EPS insulation boards 20 is the one component polyurethane stick foam 33, as show in FIG. 4. To install this inner insulation component, constructive procedures can utilize the classical Portland cement with a setting adhesive (a 100 percent polymer based product) on gypsum sheathing 5, or mechanical fasteners for wood frame 2 with plywood sheathing 7, but these attachment systems are not recommended. Water from cementitious materials can remain billet inside NP-EIFS, and mechanical fasteners pierce the substrate vapor barrier 15 and the plywood sheathing 7, permitting inside vapors to penetrate into the insulation cladding. The EPS 20 layer component performs intermediary functions. As is well known in the construction industry, wall frame is not always straight, substrate have surface irregularities and dimensional tolerances which need to be corrected when EIFS cladding is installed. Expanded polystyrene 20 provide a great workability, to create a flat surface, necessary and obligatory to install the outer layer, the rigid extruded polystyrene XPS 30. Ways and means to create inherent flatness as support and substrate to install the non-permissive layer 25 are provided on this invention by rasping, sanding and leveling 20R operations, performed over the entire EPS 20 member (equalization component) of NP-EIFS cladding. The inner extra insulating member is also beneficial when installing flashings 84, 85 or 86 especially not constructive attached flashing 85 or 86 to have enough thickness and technological facility to easily embed flashing 85 or 86 in polyurethane foam sealant 35. First insulating layer 20, shall be held back installed from the opening edge, 1½-2 inch (38-51 mm) in not flashed sides, and about ½ inch (13 mm) up to top flashing 84, 85 or 86 vertical flange, as shown in FIG. 6 and in all detail figures. The extruded polystyrene board 30 will easily overlap the flashing 84, 85 or 86 vertical flange being install ½ inch (13 mm) above the horizontal element of flashing 83. Also, XPS layer 30 is installed close to the sides of constructive element 80, 90 or 91, just enough to have space to fill the gap with expanded polyurethane foam 35. Also, EPS 20 member will help NP-EIFS to accommodate building movements, wall contractions and dilatations, being more elastic than extruded polystyrene XPS 30, and will add an extra insulation of 3.85 R-value per inch.

Referring now to the view of FIG. 1 and also to the view of FIG. 2, the non-permissive layer 25 is adhesively installed, either on equalization component 20 or directly to the substrate sheathing 5 or 7 treated with the sheathing membrane 15. The process of application, as seen on FIG. 4 is easy and convenient, a girdle of stick polyurethane foam 33 is applied on the back side of the extruded polystyrene foam 30 following the perimeter of XPS 30 board and sinusoidal in field, about 4 inch (10 cm) between ribbons. The XPS boards 30 of the non-permissive insulation assembly 25 are jointly installed, in a running bond pattern and interlocked at corners.

As illustrated in FIGS. 1, 2, 3 and 4, inside and outside corners 56 and not shiplap joints 57 of XPS boards 30 are assembled with a gap of ¼-¾ inch (6.5-19 mm) between not shiplap XPS 30 edges, to be filled with expanded polyurethane foam sealant 36, a good caulk-and-seal (foam-and-seal). Extra expanded polyurethane foam 36 (the expansion rate during the curing process) is cut and rasp to a straight level and treat with polymer-based sealant material 45, to create an impervious to water and vapors interconnection.

Figure 5B:
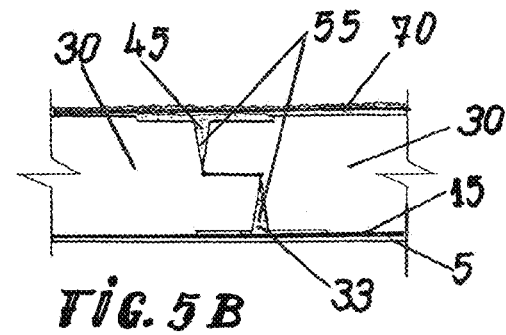
FIG. 5B is a cross-sectional of XPS boards joint area, showed in FIG. 5A, but assembled and sealed, according to the invention.

As seen in the cross-sectional view of FIG. 5A, detail of L-type shiplap joining edges is reinvented, so as, after assembly, to create a deep V-joint between XPS 30 joining boards. This joint 55 is created symmetrical on both sides by inclination of L-type edges from interior to exterior with an angle of 5° to the normally perpendicular. Also, a 1/12 inch (2 mm) retraction of about 1 inch (25 mm) around XPS 30 board edges is constructive created. This invention constitutes significant improvement in order to create a non-permissive assembly using non-permissive materials by creating constructive interior and exterior 10° angle deep V-joints, when XPS boards 30 are assembled, to be filled with stick polyurethane foam 33 (interior) and sealant material 45 (exterior). Before installing every next XPS board 30, a girdle of stick polyurethane foam 33 is continuously applied on the two edges of previously installed XPS boards 30, as shown in FIG. 4. In the cross-sectional view of FIG. 5B, is shown the detail of joint assembly 55, when the stick foam 33 fills the interior deep V-joint created, having a very low expanding coefficient, and the exterior deep V-joint is filled with polymer-based sealant material 45.

As prior described and showed in FIGS. 1 and 2, constructive and aesthetical vertical 41 and horizontal 42 joints are cut, after installing polyurethane foam sealants 35, 36, 37 (including rasping and leveling) and before treating joints 55, 56, 57 with sealant material 45, to be in the spirit of the invention.

Referring to the views of FIGS. 1-4 and the perspective view of FIG. 6, it can be seen that the bottom edge of insulating members 20 and 30 actually rests ½-1 inch (13-25 mm) above the horizontal leg of track 11. The standard starter track 11 (not drainage), which is preferably plastic, may be variously constructed for attachment and cementation 17 to the air-vapor resistant membrane 15. According to the invention, insulation boards 20 and 30 edges will be completely encapsulated in closed cell expanded polyurethane foam 37, which expand in the space created, and seal the bottom edge. The extra foam lengthways the starter track 11 is cut, rasped, and treated with sealant material 45, in the process of exterior sealing. The location of starter track 11 is usually limited to terminations at foundation. Also, metal or plastic corner accessories 12 are regularly necessary to be use, since straight exterior corners are difficult to be created, because of interlocked, interspaced and double sealed with polyurethane foam 36 and sealant material 45 of XPS boards 30. In practice, exterior plastic or metal corners 12 will be installed, after the sealant material 45 is completely dry, using the basecoat 71, the first layer of lamina 70.

Finally, FIGS. 1, 2 and 6 shows gradually the exterior weather resistant assembly, generically called the rainscreen or lamina 70. It is well known and understood in the relevant art, that the reinforcing glass fiber mesh 72 is installed onto the insulation substrate 25 by first applying a thin coat of cementitious basecoat 71 (100% acrylic polymer based, requiring the addition of Portland cement) and then laying the reinforcing mesh 72 into the uncured basecoat 71. A second layer of basecoat 73 is applied and forced to voids in the reinforcing mesh 72, and allowed to dry. As a result, the reinforcing mesh 72 became embedded in the basecoat 71, 73. To complete the wall, a textured and integrally colored finish 75 is trowel-applied and floated to the desired look, also as known to one skilled in the art. Product specifications for regular water-based acrylic coatings and especially for elastomeric and specialty finishes require acrylic coatings 74 to prepare surfaces for finish 75 applying.

As later shown in detail, FIG. 6 depict a NP-EIFS cladding construct with extra insulation member 20, perspective view and section through wall assembly and redesigned window frame 80, in accordance with this invention. Knowing that all constructive elements 80, 90, 91, 92 are installed prior to beginning of NP-EIFS installation, as above described, and rough openings are not sealed by extending the air/vapor resistive barrier 15 to the interior face of the wall opening, pre-installation of constructive elements 80, 90, 91, 92 (before cladding) have a great advantage and its preferable in construction industry. According to the invention, closed cell polyurethane foam sealant 35 seals the gap created around opening perimeter for interior wall cavity vapors, exterior vapors being stopped by the impervious layer 25. The air-vapor resistive membrane 15 is applied to coat all sheathing 5 or 7 visible surface, polyurethane foam sealant 35 which seals the gap will overlap sheathing membrane 15, about 1-2 inch (25-50 mm), around opening, when expand to fill the empty space created through held back of EPS 20 and XPS 30 layers when installed. Cost savings over typical drainage EIFS through not sealing rough openings will compensate the cost of applying polyurethane foam 35, with exceptional advantages.

Still detailing FIG. 6, corners of wall components in general and windows/doors 80 in special need particular attention. As seen in the front view of FIGS. 7B and 7E, caulking joint delimitation elements 81, 82, 83 require constructive assembling, to form continuous transitions between vertical elements 82 and horizontal lower element 81, and transition to flashing, which have a perpendicular position of caulking element 83 to the side vertical element 82. Also, the insulation XPS board 30 shall be installed so that its joint 55 does not coincide with the corners of the opening, and to be additionally reinforced using "butterfly" strips of mesh 72 laid at a 45° angle to the corner, when lamina 70 is applied (not figured).

Referring to FIGS. 8A and 8B, in the most preferred embodiment, the new sealant system assembly of the instant invention is applied to air conditioning unit 90, a constructive element that penetrates the wall, having large utilization in the hotel industry. The flashing 84 is constructive attached, as is the caulking delimitation elements 81, 82, 83. Polyurethane foam sealant 35 will seal the perimeter of air conditioning unit 90, insulation boards 20 and 30 edges, and also fix the element 90 to the wall frame. Sealant material 45 will seal the outer surface of the non-permissive layer 25, around opening, according to the invention. Application of silicone sealant 65, after the reinforcing member 72 embedded in basecoat 71 and 73, finalize the sealant ensemble system.

As previously mentioned, the new NP-EIFS is contemplated to be successfully applied to classical window/door systems, and also to various wall structures. In this regard, FIGS. 9A and 9B show a cross sectional detail view of above and lateral part of classical window frame 80A, installed on wood frame 2 with OSB substrate sheathing 7. The flashing 85 (preferably) is fastened attached to the window frame 80A (not to the wall sheathing when using flashing tip 85), with outdistance of about 1 inch (25 mm) from substrate sheathing 7. Insulating member 20 is installed onto the air-vapor barrier 15, trowel applied to the substrate 7, followed by the impermeable insulating member 30. With reference to FIG. 9A, the permissive insulating member 20 is held back installed about ½ inch (13 mm) above vertical flange of flashing 85, and the gap created is filled with polyurethane foam sealant 35. The impermeable member 30 is then installed ½ inch above the horizontal caulking delimitation element 83, then it completes the seal up with polyurethane foam 35, over seal the edge with sealant material 45 and silicone sealant 65 is applied, after the reinforcing member 71, 72, 73 of lamina 70. Also, sealing behind flashing drip edge, by applying silicone sealant 66, is required. As illustrated in FIG. 9B, the preferred method of making the sealant ensemble system, in the rest of perimeter, includes the application of 4-6 inches (10-15 cm) of extruded polystyrene XPS foam band 31, to replace the edge area of expanded polystyrene EPS foam 20 layer. It will be generally appreciated that the permissive member (EPS 20) is to close to the exterior environment, existing suspicions of vapor penetration into the system, and for that, intersections with classical constructive elements are treated as terminations of the system (FIGS. 15A and 15B). First layer of EPS 20 is installed, including the band of XPS 31 around window 80A, with a retraction of about 1½ inch (38 mm) from the opening edge. The gap created between opening frame, window frame 80A and insulation board edge 31, is filled with expanding polyurethane foam sealant 35, cut and rasp to that level. On this stage, a pre seal with sealant material 45 is recommended to seal the expanded polyurethane foam 35 surface (not figured). The non-permissive layer 25 is then installed, and XPS boards 30 shall be ½ inch (13 mm) held back installed from window frame 80A. I mentioned here that, window/door frame 80A must be constructive installed ¾ inch (19 mm) up to the outer surface of the first layer of insulation (20), so as to the portion not embedded in insulation (polyurethane foam 35), with the edge of XPS 30 layer and the polyurethane foam sealant 35 level, to create a caulking joint. The joint created will be sealed with sealant material 45, reinforced with mesh. This is usually done through the use of stick mesh and then trowel apply the sealant material 45 (not figured). The reinforced basecoat adhesive 71, 72, 73 is applied and then the silicone sealant 65 will complete the sealant ensemble system.

FIGS. 10A, 10B and 10C, cross-sectional detail views, depicts the NP-EIFS cladding system of the instant invention as applied to an CMU 3 masonry wall, having installed a window frame 80B, particularly showing the sealant ensemble system. When window frame 80B is installed without flashing (onto the median axle of the wall), the insulation system must extend to the interior face of the wall opening. Attention is invited to the view of a preferred construction for window frame 80B, having a perpendicular member 83, which makes up the caulking joint, around perimeter. Polyurethane foam sealant 35 installed about 1 inch (25 mm) around window frame will fill the gap, seal the inside vapors and insulate the constructive element 80B to the wall. Insulation corners of the opening perimeter are created as above described, according to the invention. A drip joint 44 is required to the above part of the opening (FIG. 10A). The exterior surface of the non-permissive layer 25 consisting in extruded polystyrene foam XPS 30 and expanded polyurethane foam 35 which fill and seal the gaps is treated (over seal) with sealant material 45. To the outside of the installed non-permissive assembly 25, reinforcing mesh 72 is embedded into polymer modified cementitious basecoat 71, 73 layers, and allowed to dry. The sealant ensemble system is finalized by applying the silicone sealant 65.

Turning now to the preferred construction of through the wall elements, with reference to FIG. 11, the ordinary electrical boxes, constructed in accordance with the present invention is shown. The outlet of electrical box 91 is redesigned, so as to have the caulking joint member 81A (type 81, 82), which surrounds the element, to easily complete the sealant ensemble system by installing the silicone sealant 65. Prior installed by others, electrical box 91 has a back flange member 14 for cementation 18 to the sheathing when the impermeable membrane 15 is installed. Polyurethane foam sealant 35 will encapsulate the electrical box 91 and also the edges of XPS 30 and EPS 20 insulation members, which are held back installed from the element 91. The outer surface of polyurethane foam 35 is over sealed with sealant material 45, following the vapor sealing technology. Reinforcing member 71, 72, 73 of lamina 70 is applied and allowed to dry. Having the caulking joint, created between the constructive member 81A and exterior surface of non-permissive assembly 25, the silicone sealant 65 will easily complete the sealant ensemble system. Switch or plug covers, adapted for the new electrical boxes will aesthetically mask the caulking area. Outdoor wall and ceiling electrical boxes are typically used for installation of wall or ceiling mounted light fixtures. The construction of electrical box 91 is a combination of plastic or metal boxes having round, square or octagonal shapes. The depth of electrical box 91 is adapted to the thickness of insulation, so as the distance between the back flange member 14 and the caulking joint member 81A is in fact the thickness of insulation (20 and 30, or just 30) plus the reinforcing component of lamina 71, 72, 73 about ⅛ inch (3 mm) plus a dimension for the caulking joint, (¼-½ inch). If the depth of electrical box 91 is required to be greater than this dimension, the back flange member 14 is placed intermediary (not extending from the back of electrical box) and the extension of electrical box will penetrate the substrate sheathing 5 or 7 in a cutting up. Wiring the electrical box 91 is acceptable just in the back.

Still referring to wall penetrations, FIG. 12 shows a pipe passage, which complies with the principle of non-permeability. As solution is invented a plastic flange 92, constructive adapted to the thickness of insulation cladding and wall construction, which has an installation back flange member 14 for fastened installation and cementation 18 to the sheathing, to ensure the continuity of air/vapor barrier 15, and also a surrounding member 81A, which create the caulking joint for silicone sealant 65. The sealant ensemble system is similarly constructed, by installing polyurethane foam sealant 35 around flange, cut and rasp the extra foam, apply the over sealant 45 and complete the surface with the reinforcing component 71, 72, 73 of lamina 70. Silicone sealant 65 is installed before finish coat 75, to complete the sealant system. An additional insulation member consisting in polyurethane foam 36 is applied around the portion of flange situated inside the wall cavity. The purpose of insulation 36 is to avoid condensation of inside wall cavity vapors to the flange body, the constructive element 92 being a thermal bridge for cold exterior environment.

FIGS. 14 and 15A,B illustrates the system of the instant invention as applied to frequently encounter in practice, termination points. Specifically, FIG. 14 shows the NP-EIFS in the context of a parapet termination. A realistic detail is designated to be easy and convenient to apply. When the air/vapor liquid membrane 15 is installed, the joint between substrate sheathing 5 or 7 and the top element 8 (preserved wood) is sealed as a sheathing joint 16. The edge portion of expanded polystyrene EPS 20 member (if used) is replaced with a band of 4-6 inch (10-15 cm) of extruded polystyrene XPS 31, held-back installed from top element 8 with 1-2 inch (25-51 mm). The impermeable layer of XPS 30 is installed, with ½ inch (13 mm) distance from the top element 8. The gap created is filled with expanded polyurethane foam 37. Sealant material 45 will complete the impervious layer 25, by sealing the joints 55 and the exterior exposed surface of expanded polystyrene foam 37. After the reinforcing layer of lamina 71, 72, 73 is installed, a metal cap 96 will cover the top of parapet, the front top of NP-EIFS and the roof membrane 99. A suitable silicone sealant 67 is applied to seal the top metal flashing 99, and the finish coat 75 will complete the system.

FIG. 15A shows the system of the instant invention as applied to vertical termination where NP-EIFS is in juxtaposition with the brick wall cladding 4. First mention is that, NP-EIFS cladding is installed before brick wall cladding. The impermeable membrane 15 is installed to exceed the insulation edge limits. As a general rule, at all termination locations, where the expanded polystyrene EPS 20 insulation member, if used, come in contact with the exterior, a band of 4-6 inch (10-15 cm) of the permissive EPS board 20 layer edge is replaced with the impermeable extruded polystyrene XPS 31 insulation board. Expanded polystyrene EPS 20 is permissive to vapor diffusion, and for that, the insulation board edges shall be either encapsulated in expanded polyurethane foam sealant (35, 36, 37, 38) or substitute on edge portion of a minimum of 4-6 inch (10-15 cm), with a band of rigid extruded polystyrene XPS means 31. After the inner insulation member (EPS 20) is installed with a band of XPS 31 around the edge, the impermeable XPS 30, insulation layer is adhesively applied, using stick polyurethane foam 33. Sealant material 45 will completely encapsulate insulation board edges (XPS 30, 31) and embed stick mesh or reinforcing fabric at terminations. By edge-wrapping with reinforcing mesh, installed with sealant material 45, the edge termination is safe from cracking and detachment, when negative loads occur. The self adhesive mesh prior installed, or lying reinforcing fabric into the wet sealant material 45, shall exceed a minimum of 1½ inch (38 mm) on the frontal surface of the impervious assembly 25, cover the XPS 30, 31 edges and extend at least 2 inch (51 mm) to the adjacent air-vapor resistive barrier 15 of substrate 5 or 7 surface. A liberal coat of sealant material 45 is applied and smooth out to ensure a continuous film free of voids, pinholes or other discontinuities, and allowed to dry. The termination is reinforced and sealed to successfully stop exterior vapor pressure to drive vapors into the system. The reinforcing mesh 72 of the rain-screen or lamina 70 also shall be edge-wrapping the edge, which means continuation of base coated (71, 73) fiberglass mesh 72 around the edge of the insulation boards 30, 31 and onto the adjacent substrate 3, 5 or 7. To enclose the brick cladding 4 (or other) to the insulation system, a joint of ¾ inch (19 mm) is required. A sealant backer rod 69 is applied to complete the three sides of the joint, and a suitable silicone sealant 68 will weather seal the joint.

Still referring to edge terminations, FIG. 15B show a vertical cross-sectional view of the horizontal system termination, showing the start of NP-EIFS above brick cladding. Every step is similar to above described termination sealant system. The single new element is the bottom band 32, a common architectural element for EIFS industry. In accordance with the aspect of design flexibility, aesthetical effects are created using expanded polystyrene foam and applied over the non-permissive layer assembly 25, which have the joints and terminations sealed. In this case, the bottom band 32 is made out of extruded polystyrene foam, and is part of the sealed termination. The reinforced sealant material 45 is extended also to the edge band. The silicone sealant 68 is preferably applied to non-permissive areas.

System terminations are not limited to the above description and illustration of the invention, plastic accessories such as casing beads can be used for termination of NP-EIFS in lieu of edge-wrapping, to provides straight terminations and joint lines, and facilitate sealant maintenance, if the principle of non permeability is materialized.

Figure 16:
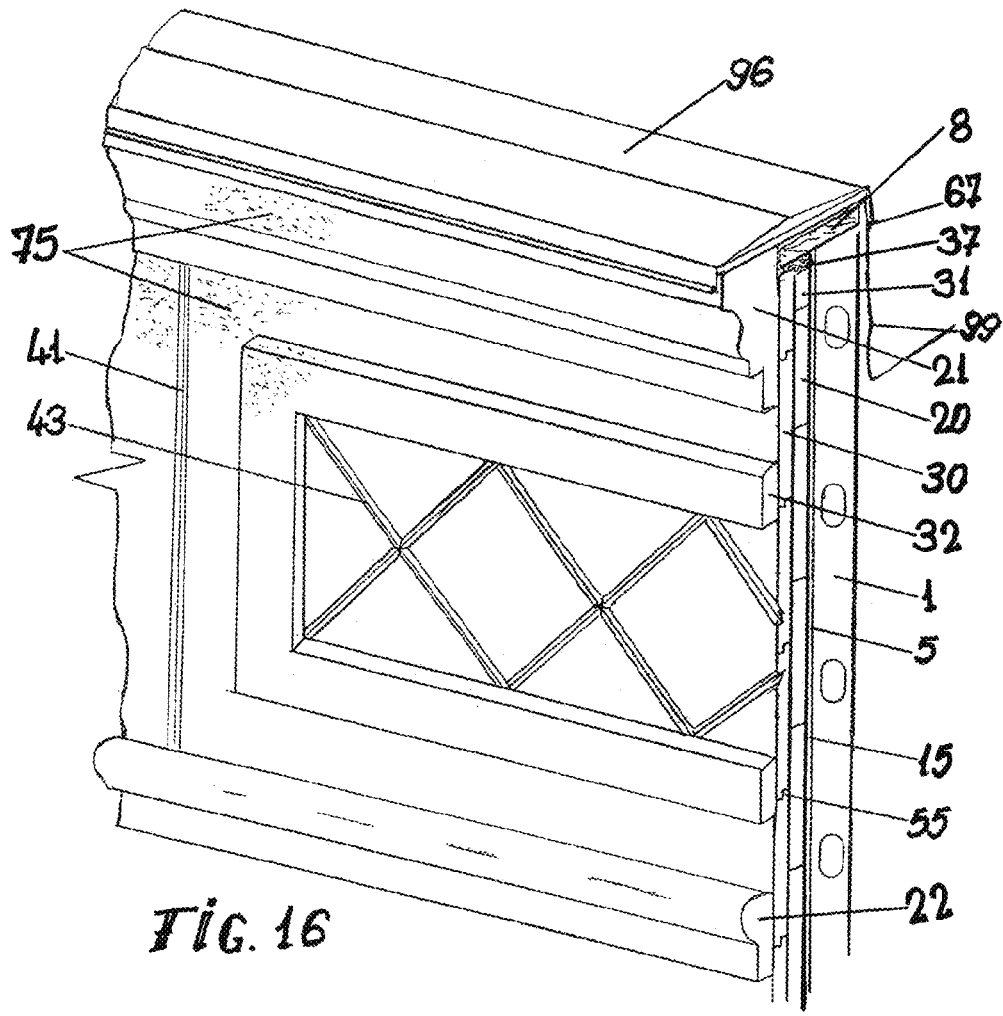
FIG. 16 is a perspective view, partially in section to show boundless design flexibility of the NP-EIFS systems, showing crown moldings, aesthetical and control joints and bands, according to the invention.

An attractive feature of the present invention is that the design flexibility of NP-EIFS is not affected by creating the non-permissive layer 25. FIG. 16 illustrates the variety and the ease with which it can be constructed sculptured contours, for the newly developed NP-EIFS applied to an associated wall assembly. Prior to install design effects 21, 22, 32, is required to finalize the non-permissive layer 25, including the terminations and the sealant assembly around openings. Also, expansion joints 40 are installed, and structural and aesthetical joints 41, 42, 43 are cut before sealing joints 55, 56, 57 of XPS 30, with sealant material 45. The XPS 30 insulation layer shall be applied at a minimum thickness of 1½ inch (38 mm), for vapor diffusion reasoning. Any aesthetical or control joint 41, 42, 43 is cut so that a minimum of ¾ inch (19 mm) of impermeable insulation remains at the base of the groove. In areas where moldings are installed, XPS joints 55, 56, 57 must be reinforced with grid tape, in the process of sealing with sealant material 45. Windowsills and bands applied to window/door frame type 80 are recommended to be included in the non-permissive layer 25 by using XPS bands type 32 (not figured). If not possible, the sealant ensemble system is completed behind molding, by reinforcing the polyurethane foam sealant 35 area with grid tape in the process of sealing with sealant material 45, and applying the suitable sealant 65 (without reinforced basecoat 71, 72, 73). Expanded polystyrene moldings 21, 22 are then adhesively applied. Back wrapping with reinforcing fabric around the edge and onto the substrate (25) in back of over applied molding is required (not figured).

For new or retrofit building designs, 3-dimensional shapes and modern graphics can be created with expanded polystyrene foam. These aesthetic affects, such as crown moldings 21, ornamental bands 22, bands 32 etc., are lightweight and economical to produce with beautiful repetitive accuracy. In one preferred embodiment, molding shapes are adhesively applied to the outer surface of the non-permissive member 25, by using stick polyurethane foam 33.

The outer layer, known as the rain-screen or lamina 70 is applied to the outer surface of the non-permissive layer 25 and EPS moldings, in the standard way known to those skilled in the EIFS industry. The reinforcing mesh 72 is installed onto the insulating substrate, becoming embedded in two layers of basecoat 71, 73 (polymer modified cementitious material). Once dried, the reinforcing layer is sufficiently flexible so as to permit normal movement and bridge across movements in the impervious assembly 25, and also to provide the reinforcement of sealing joints 55 of XPS boards 30. The finish 75 shall be the type, color and texture as selected by the architect or owner, to complete the exterior walls look.

Figures 17, 18:
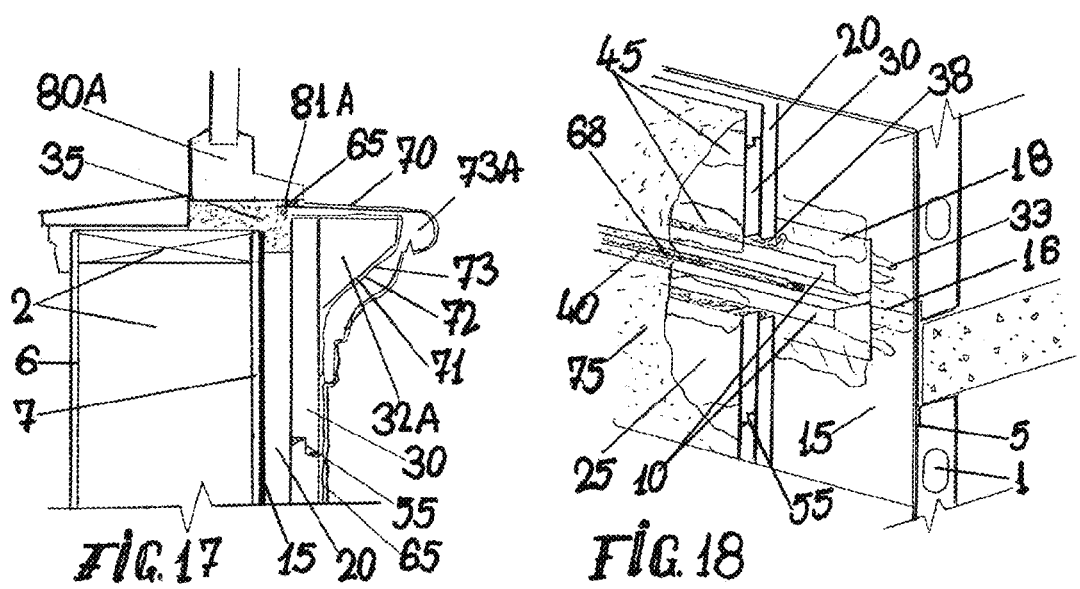
FIG. 17 is a cross-sectional detail view of a classical look sill, showing the possibility to create a hard stucco look, strength and lasting over NP-EIFS, according to the invention.
FIG. 18 is a perspective view, partially in section of expansion structural joint, showing a designed interruption in the continuity of insulation, using specially designed expansion joint profiles, as accessories of NP-EIFS, seal and bond to the substrate and to the impermeable insulation, according to the invention.

For purposes of example of unlimited possibilities to use NP-EIFS, FIG. 17 illustrates a windowsill, having a non-permissive substrate 25, a sealant ensemble system, which surrounds the window frame 80A, and a cementitious template sill, which creates a hard-stucco look for the building. A preformed element 32A preferably made of extruded polystyrene foam, the particular preferred material for use in improving the water-resistant properties of EIFS cladding, is adhesively attached to exterior surfaces of the impermeable layer 25. The shape of element 32A shall follow the contour of final molding (not absolutely necessarily), with a retraction of ¼-½ inch (6-13 mm). The mesh layer 72 embedded into the basecoat 71, 73 is applied to the exterior of the impermeable layer 25, including the molding pre-forming member 32A. The reinforcing layer 71, 72, 73 will stop to the limiting vertical element 81A which is a flange extending from the window frame 80A, about one inch retracted from the outer bottom limit of window frame 80A, behind the sill of window. In this case, the limiter element 81A became hidden. Additional mesh 72 and basecoat 73 may be applied over the surface of molding substrate 32A, and the close related area. An elastic polymer modified cementitious material 73A designed to avoid cracks, is applied to form the sills molding. As is well known in the relevant art, the construction of hard stucco trims use a gliding template to form the exterior appearance. The impervious layer 25 including the preformed member 32A shall be one inch held back installed from window frame 80A member, so as after the finale molding layer 73A is finished and dry, to have a caulking joint for installation of silicone sealant 65 (thickness of reinforcing layer 71, 72, 73 and molding layer 73A is about ½ inch). The cracks problems of hard stucco trims applied directly to the wall frame 2 and sheathing 6 have prevented by using the insulation cladding materials as substrate. Polystyrene insulation members, especially EPS 20 layer and expanding polyurethane foam are elastic materials, which can accommodate building movements and small deformations on the wall frame. Lastly, the further component is the finish coat 75, an acrylic base or silicone enhanced textured wall coating applied onto the exterior surface.

FIG. 18 depicts the Non Permissive EIFS of the instant invention as applied to an expansion joint 40. Expansions and contractions of NP-EIFS, and adjacent materials shall be taken into account in the design and location of expansion joints 40 by the designer. Continuous expansion joints 40 shall be installed where expansion joints occur in the substrate system, where building expansion joints occur, where the substrate changes and significant structural movement is anticipated, with proper consideration given to sealant properties, installation conditions, temperature range, coefficients of expansion of materials, joint width to depth ratios, and other material factors.

One of the code requirements in EIFS construction is that the insulation sheets that abut any system terminations have the mesh and basecoat extend underneath and along the edge of terminations. To meet those requirements when creating expansion joints, relative to NP-EIFS concept is difficult and unsuitable. The present invention provides a convenient solution by utilization of expansion joints construction accessories 10, preferably plastic (polyvinyl chloride). As seen in the view of FIG. 18, expansion joint accessory 10 generally includes a back flange and two parallel and symmetrical flanges situated perpendicular to the back flange. The two parallel flanges have three distinct areas. The first two segments are perpendiculars to the back flange and form the joint for caulking 68, the next two members are oblique situated to create the look and also for better plastering access and the last two symmetrical segments become parallel with the back flange. The expansion joint accessory 10 is practically an assembly of two casing beads, situated parallel and in opposition, ready to be installed at once. The area of back flange, which connect the two parallel casing beads shall be flexible and may be fragmental to can accommodate building movements, without damaging the terminations. Back flange is a generally elongated panel configured for being mounted adjacent to a structural support member of a structure (1, 5 or 2, 7). The joint member 10 is fixedly attached to the outer surface of the coated (15) substrate member 5 using mechanical fasteners like screws. Expansion joint 10 is installed over an uncured sealant material such as sheathing liquid membrane 15, exterior sealant material 45 or even polyurethane stick foam 33, which are sealants and also adhesives. The air-vapor barrier 15 is extended with reinforcing grid tape (18) over the back flange of joint accessory 10, for sealing and cementation 18 to the substrate 5. Insulating materials 20, 30 are next applied. The space between casing beads and insulation edges is fill with expanded polyurethane foam 38, the extra foam lengthways the joint accessory 10 is cut and rasped, and treated with sealant material 45, according to the invention. Sealant material 45 shall extent over the leveling flange of joint accessory 10, in the process of exterior sealing, being also a primer coat for the polymer modified cement 71 (first layer of lamina 70) to adhere to the plastic joint 10. As a result, the joint accessory 10, air-vapor barrier 15 of the sheathing 5 and the outer impermeable layer 25 created, form an impervious enclosure partially surrounding and encasing the two joining terminations of the expansion joint 40. Lamina 70 with the pleasing finish coat 75 is applied to the visible edge, and a suitable sealant 68 will complete the expansion joint 40.

In the foregoing description, certain terms have been used for brevity, clearness and understanding, but no limitations are to be implied there from beyond the requirements of the prior art, because such terms are used for descriptive purposes and are intended to be broadly construed. Moreover, the description and illustration of the invention is by way of example, and the scope of the invention is not limited to the exact details shown or described.

As a conclusion, the present invention identifies the presence of water behind EIFS cladding as condensation water, a result of two distinct situations:

On the summer or in hot humid climates, a permanent dew point (condensation surface) occurs behind EIFS, a low temperature is maintained if the building enclosure is culled from inside, by the air conditioning. Exterior vapors are driven inwards through the permissive insulation by a high vapor pressure differential between exterior and inside insulation cavity. The present invention foresees to do away with vapor diffusion through EIFS cladding by creating a non-permissive insulation assembly 25, including the intersections with constructive elements, by using above described or similar materials. In this situation, NP-EIFS prevents building assemblies and surfaces to getting wet from the exterior;

On winter and cold climates, flashings and other through the insulation elements in contact with the wall assembly, create cold areas, auspicious for moisture accumulation. The present invention also foresees to insulate all exterior elements that penetrate the wall, including flashings, by completely separating those elements from wall assembly and encapsulating the opening edge in closed cell polyurethane foam or similar expandable insulation materials. The air-vapor impermeable membrane 15 and the sealant ensemble system, which surround the constructive elements, prevent building assemblies and surfaces from getting wet from the interior.

It should be understood that the selection specific substrates, adhesives and even other forms of closed cell expandable polymers such semi-rigid two component polyurethane spray foam, directly applied to the retardant membrane of substrate, can be utilized in the systems of the present invention, and can be determined by one having ordinary skill in the art, without departing from the spirit of the invention, herein described.

It is also to be understood that the following claims are intended to cover all of the generic and specific features of the invention herein described, and all statements of the scope of the invention which, as a matter of language, might be said to fall there between.

What is claimed is:

1. An exterior insulation and finishing system (EIFS) for application to a frame or sheathing of a building, comprising:
   an optional liquid applied vapor barrier layer applied to either the frame or the sheathing to reduce vapor permeance from inside of the building to the EIFS;
   a vapor impermeable insulation assembly placed on an exterior surface of the sheathing or vapor barrier layer by sticking and back sealing over the sheathing or liquid applied membranes to substantially prevent vapor diffusion through the insulation, wherein the impermeable insulation assembly comprises a plurality of vapor impermeable insulation boards and the joints between the boards are sealed with an expandable polyurethane spray foam and a separate polymer based material such that warm vapor from inside or outside of the building does not contact with zones with significant differences of temperatures, to prevent moisture to be created within the wall or insulation;
   a reinforcing layer embedded in a basecoat of cement and polymer, the reinforcing layer being applied to the exterior of the impermeable insulation assembly; and
   an exterior finish applied to the reinforcing layer.

2. The EIFS of claim 1, wherein the vapor impermeable insulation boards are extruded polystyrene thermal insulation (XPS) boards having water vapor permeance of less than or equal to approximately 0.1 perm, class I of permeability.

3. The EIFS of claim 2, wherein the extruded polystyrene thermal insulation (XPS) board has at least one L-shaped joint edge and the joint between two boards longitudinally creates first and second deep V-shaped joints, wherein the first joint is created between the boards and the substrate or vapor barrier layer and the second joint is created between the boards and the reinforcing layer.

4. The EIFS of claim 3, wherein the series of the extruded polystyrene thermal insulation (XPS) boards are joined together and attached to the substrate or vapor barrier layer by sealing the first deep V-joints using expandable polyurethane spray foam.

5. The EIFS of claim 4, wherein the second deep V-joints are filled with a sealant material, which is a polymer-based water and vapor retardant material.

6. The EIFS of claim 2, wherein the extruded polystyrene thermal insulation (XPS) board has at least one straight joint edge and a joint between the straight joint edges of two boards longitudinally is filled with expandable polyurethane spray foam and over-sealed with polymer-based vapor retardant material.

7. The EIFS of claim 1, further comprising an expanded polystyrene (EPS) layer between the vapor barrier and the impermeable insulation assembly.

* * * * *